(12) United States Patent
Asveren et al.

(10) Patent No.: US 10,205,757 B2
(45) Date of Patent: *Feb. 12, 2019

(54) COMMUNICATIONS METHODS, APPARATUS AND SYSTEMS FOR CORRELATING REGISTRATIONS, SERVICE REQUESTS AND CALLS

(71) Applicant: Sonus Networks, Inc., Westford, MA (US)

(72) Inventors: Tolga Asveren, Bordentown, NJ (US); Subhransu S. Nayak, Nashua, NH (US)

(73) Assignee: Sonus Networks, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,486

(22) Filed: Apr. 30, 2018

(65) Prior Publication Data

US 2018/0295162 A1    Oct. 11, 2018

Related U.S. Application Data

(60) Continuation of application No. 15/492,196, filed on Apr. 20, 2017, now Pat. No. 9,961,118, which is a
(Continued)

(51) Int. Cl.
*H04L 29/06* (2006.01)
*H04W 60/00* (2009.01)

(52) U.S. Cl.
CPC .......... *H04L 65/1083* (2013.01); *H04L 63/08* (2013.01); *H04L 65/1006* (2013.01);
(Continued)

(58) Field of Classification Search
CPC ............... H04W 60/00; H04W 60/005; H04L 65/1006; H04L 65/1016; H04L 65/1073;
(Continued)

(56) References Cited

U.S. PATENT DOCUMENTS 9,713,112 B1 * 7/2017 Asveren .............. H04W 60/005
9,961,118 B2 * 5/2018 Asveren .............. H04W 60/005
(Continued)

*Primary Examiner* — Diane D Mizrahi
(74) *Attorney, Agent, or Firm* — Straub & Straub; Stephen T. Straub; Michael P. Straub

(57) ABSTRACT

The present invention relates to communications methods, apparatus and systems for correlating registrations with subsequent requests for service, e.g., calling or other services or active calls. In one embodiment requests and corresponding registrations are determined through a method of operating a session border controller (SBC) which includes the assignment of a registration instance identifier by the SBC to each registration request, sending a first message including the registration instance identifier to each user device in response to each registration request, and determining if subsequent requests correspond to the registration instance based on the registration instance identifier being included in subsequent requests. In another embodiment, after a SBC switchover, the new SBC forks a mid-dialog request received for a first call to all active registered devices having the same address of record and determines based on the responses which device has an active dialog corresponding to the first call.

20 Claims, 18 Drawing Sheets

Related U.S. Application Data division of application No. 14/873,825, filed on Oct. 2, 2015, now Pat. No. 9,713,112.

(60) Provisional application No. 62/235,438, filed on Sep. 30, 2015.

(52) U.S. Cl.
CPC ...... *H04L 65/1063* (2013.01); *H04L 65/1073* (2013.01); *H04W 60/005* (2013.01)

(58) Field of Classification Search
CPC ............. H04L 65/1063; H04L 65/1069; H04L 65/1046; H04L 65/105
See application file for complete search history.

(56) References Cited

U.S. PATENT DOCUMENTS

| | | | |
|---|---|---|---|
| 2016/0021145 A1* | 1/2016 | Khalil | H04M 3/42 455/552.1 |
| 2017/0085455 A1* | 3/2017 | Chiang | H04L 65/1006 |
| 2017/0118255 A1* | 4/2017 | Tsai | H04W 8/183 |
| 2018/0048681 A1* | 2/2018 | Chiang | H04L 65/1006 |

\* cited by examiner

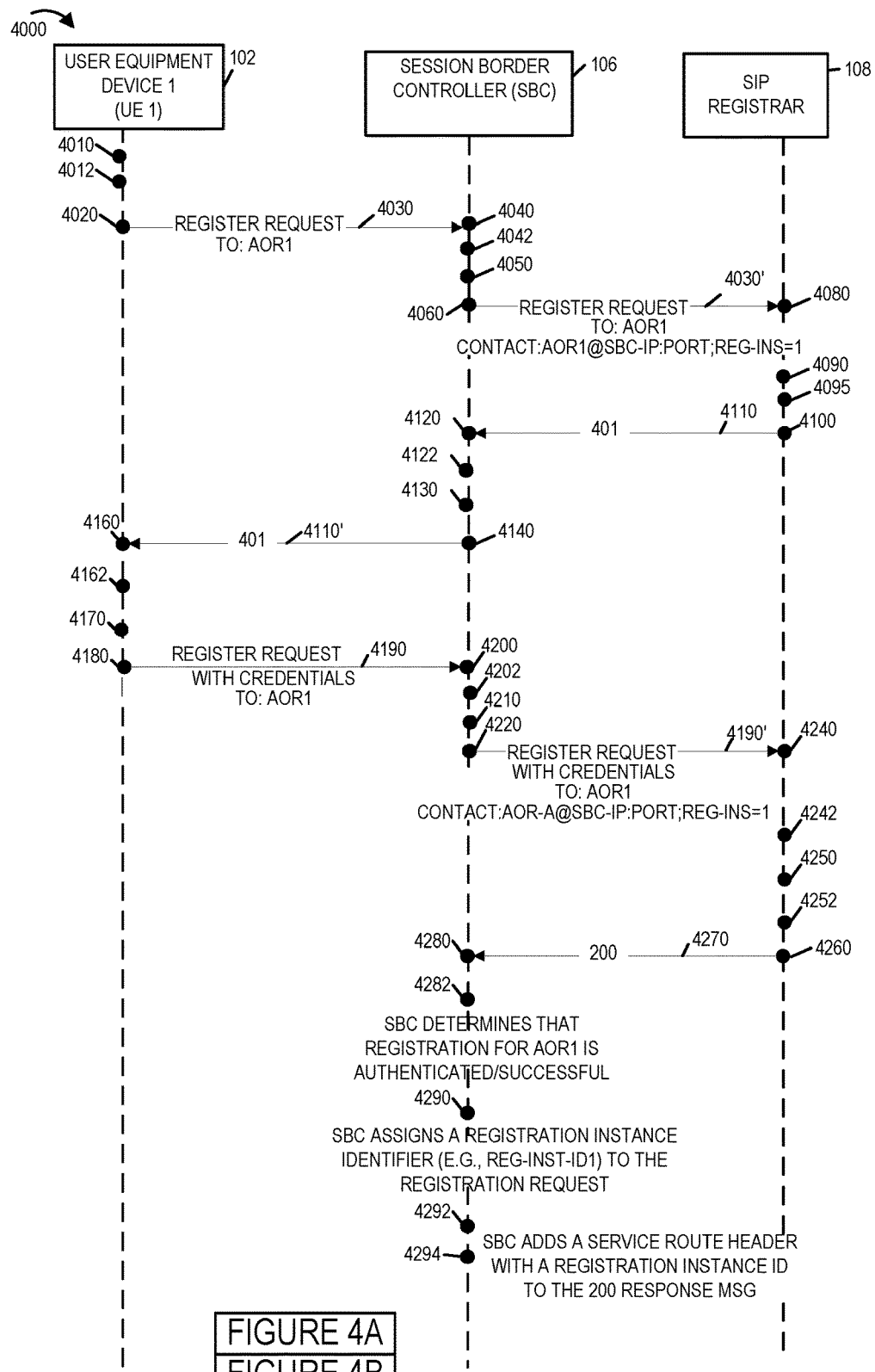

| | 1202 | 1204 | 1206 | 1208 |
|---|---|---|---|---|
| 1210 → | REGISTRATION INSTANCE IDENTIFIER | REGISTRATION REQUEST | ADDRESS OF RECORD | DEVICE |
| 1212 → | REG-INS ID=1 | R1 | AOR1 | UE1 |
| 1214 → | REG-INS ID=2 | R2 | AOR1 | UE2 |
| 1216 → | REG-INS ID=3 | R3 | AOR1 | UE3 |
| 1218 → | REG-INS ID=4 | R4 | AOR2 | UE4 |
| 1220 → | REG-INS ID=5 | R5 | AOR2 | UE5 |
| 1222 → | REG-INS ID=6 | R6 | AOR3 | UE6 |
| | ⋮ | ⋮ | ⋮ | ⋮ |
| 1224 → | REG-INS ID=6 | R6 | AOR3 | UE6 |

COMMUNICATIONS METHODS, APPARATUS AND SYSTEMS FOR CORRELATING REGISTRATIONS, SERVICE REQUESTS AND CALLS

RELATED APPLICATION

The present application is a continuation of U.S. patent application Ser. No. 15/492,196 filed Apr. 20, 2017 which is a divisional of U.S. patent application Ser. No. 14/873,825 filed Oct. 2, 2015 which claims the benefit of U.S. Provisional Patent Application Ser. No. 62/235,438 which was filed on Sep. 30, 2015, all of which are hereby expressly incorporated by reference in their entirety.

FIELD OF INVENTION

The present invention relates to communications methods, apparatus and systems for correlating registrations with subsequent requests for service and active calls.

BACKGROUND

In communication networks which support Session Initiation Protocol (SIP), user equipment devices (UEs) register with the network before they can place or receive calls. During registration a user device sends a registration request to a registration entity that registers the user device with the network.

SIP allows multiple registrations for the same address of record (AOR). This means that a user may operate and register multiple devices, e.g., such as a smartphone and a tablet device, using the same address of record (AOR). In simple terms an AOR is a like a username that is assigned to a SIP entity without regard to the device or devices that username might be used with. When a user sends a registration request from a device, the AOR corresponding to the user is specified in the TO header of the registration request. While a specified AOR corresponds to the user, the AOR does not specify the device or devices currently using that AOR. For example a user can use one single AOR to register multiple devices including, e.g., a smartphone, a SIP desk telephone, a PC, or a tablet device.

Since multiple devices may be using the same AOR and may be registered with the same AOR, when a service request, e.g., INVITE, is sent to the registrar, e.g., to establish a call, the registrar may be confused as to which of the devices registered with the same AOR the service request corresponds to. While information included in the contact header of the registration requests or INVITE signals allows a user to associate one or more devices to a single AOR by using a different IP address or port number for each device, from the perspective of the receiving device the use of IP address and/or port number to identify and/or correlate service request to registration instance is not a very reliable approach and may often prove not fruitful. FIGS. 2 and 3 discuss various deficiencies of some approaches for correlating a call to a corresponding registration instance when a plurality of devices register using the same address of record (AOR).

FIG. 2 is a drawing 200 illustrating an example that shows the problem that occurs in correlating a call to a corresponding registration instance when a plurality of devices are registered using the same address of record (AOR). FIG. 2 shows signaling between various devices during registration and later when a service request, e.g., INVITE, is sent to a registrar. For purposes of discussion consider that both UE device 262 (e.g., a smartphone) and UE device 264 (e.g., an iPAD) are being operated for using SIP services using the same single address of record, e.g., AOR-A. Thus the two devices first register with the same AOR. In this approach to correlate calls to correct registration instances illustrated in the example of FIG. 2, the session border controller SBC 266 uses a parameter in the contact header toward the registrar/AS 268 with different values for each registration instance for the same AOR. The value of this parameter allows registrar/AS 268 to distinguish between different registrations for different instances for the same AOR so that it can direct calls to the correct instance and apply services as needed. As discussed below this mechanism has shortcomings and prerequisites which makes it unreliable in a number of cases.

Consider the following discussion of the processing steps and signaling. In step 202 UE A 262 sends a registration request 203 including AOR-A as the address of record towards the registrar. The SBC 266 receives and processes the registration request 203 in step 204. In step 206 the SBC 266 includes a registration instance parameter "REG-INS" with a value "1" into the contact header of the registration request 203 to generate a registration request 203' with the registration instance parameter. Next the SBC 266 forwards the registration request 203' with the registration instance parameter "REG-INS=1" to the registrar 268. In this example the contact header of the registration request 203' is CONTACT: AOR-A@SBC-IP:port; REG-INS=1. In step 208 the registrar 268 receives and processes the registration request 203' to complete registration operations. In step 210 the SIP registrar 268 sends a signal 211 (e.g., 200 OK) to UE A 262 via the SBC 266 indicating that the registration is successful. The SBC 266 receives the 200 OK signal in step 212. In step 214 the SBC 266 forwards the 200 OK signal (as signal 211') to the UE A which receives it in step 216.

Steps 218 through 232 illustrate processing steps and signaling relating to UE B 264 registration which uses the same AOR as UE A 262. In step 218 UE B 264 sends a registration request 219 including AOR-A as the address of record towards the registrar 268. The SBC 266 receives and processes the registration request 219 in step 220. In step 222 the SBC 266 includes a registration instance parameter "REG-INS" with a value "2" into the contact header of the registration request 219 to generate a registration request 219' with the registration instance parameter. In this approach it is considered that the SBC 266 is aware that the two registration requests (203, 219) are from different devices using the same AOR and thus inserts different registration instance values in the registration requests. Further in step 222 the SBC 266 forwards the registration request 219' with the registration instance parameter "REG-INS=2" to the registrar 268. In this example, the contact header of the registration request 219' is CONTACT: AOR-A@SBC-IP:port; REG-INS=2. In step 224 the registrar 268 receives and processes the registration request 219' to complete the registration. Since a different parameter value is specified in registration request 219' than the registration instance of the existing registration 203', the registrar 268 treats the new registration 219' as a new registration attempt for AOR-A by a new instance. In step 226 the registrar 268 sends a signal 227 (e.g., 200 OK) to UE B 264 via the SBC 266 indicating that the registration is successful. The SBC 266 receives the 200 OK signal 227 in step 228. In step 230 the SBC 266 forwards the 200 OK signal (as signal 227') to UE B 264 which receives it in step 232.

When UE B 264 attempts a service request, e.g., call request, the SBC 266 is able to determine which device the service request is coming from assuming that the connection, e.g., TCP connection, utilized for both the registration request and a later service request is the same. This is illustrated in steps 236 through 240. In step 236 UE B 264 sends an INVITE message 237 towards the registrar 268. In step 238 the SBC 266 receives the INVITE 237 and determines that the INVITE 237 is in the context of the existing registration for UE B 264 and correlates the registration request 219 based on the fact that the INVITE 237 corresponds to the same call flow and used the existing TCP connection used for registration request 219 for UE B 264. Since the SBC 266 is able to correlate INVITE 237 with the correct registration for UE B 264, in step 239 the SBC 266 inserts the registration instance value for the corresponding registration, i.e., "REG-INS=2", into the contact header of the INVITE 237 to generate INVITE 237'. Further in step 239 the SBC 266 sends the INVITE 237' to the registrar 268. In step 240 the registrar 268 receives and processes the INVITE 237' and since the contact header includes the SBC inserted registration instance value "REG-INS=2" the registrar is able to correlate the INVITE 237 with the correct registration instance and accordingly is able to provide further signaling to the appropriate device, i.e., UE B 264.

While the above approach works in the scenario discussed above, one of the disadvantages of this approach is that it requires the SBC to know the instance from which the call is placed so that it can insert the registration instance parameter with different registration instance values for different registration instances in the registration requests being forwarded to the registrar thereby allowing the registrar to correlate the call with the correct registration instance. However in a number of situations it is difficult or impossible for the SBC to make such a determination. For example, in some cases the TCP connection used by a UE for a call (e.g., INVITE) is different than the one used for an earlier registration (e.g., for registration request). In some cases some devices use a new TCP connection for each call they place. In such a case the SBC may not be able to correlate the call coming over a new TCP connection with an earlier registration instance which was over a different TCP connection. In another scenario there is a SBC failover and a new active SBC instance loses its TCP connection information. When a device attempts to use the TCP connection established during registration to initiate a new call, it would detect it as down and establish a new TCP connection. Again the SBC will not be able to correlate the call over a new TCP connection with an earlier registration instance. Furthermore in cases where one or more network address translation (NAT) devices are used, with multiple instances behind the same NAT device, the source IP Address/port pair of an INVITE packet is not reliable for use in determining the correct instance placing the call. For example in some cases all REGISTER/INVITE requests from all instances behind the same NAT device use the same public IP Address and port information for INVITE/REGISTER. Thus in such cases relying on the contact header information, e.g., IP address and/or port number, to correlate a call to the correct instance is not effective. Thus it should be appreciated that this approach fails to serve the intended purpose in a number of cases and there is a need for improved methods and apparatus for correlating service request, e.g., calls, with registrations.

FIG. 3 is a signaling flow diagram 300 of an example showing the unreliability of an IP address/source port number matching approach used for call-registration instance correlation in cases where a plurality of devices are registered with the same address of record (AOR). In addition to the set of devices shown in FIG. 2, the example of FIG. 3 further involves the use of a NAT device 301 between the UE devices and the SBC 266. For purposes of discussion consider that both UE device 262 (e.g., a smartphone) and UE device 264 (e.g., an iPAD) are being operated for using SIP services using the same single address of record, e.g., AOR-A. Since the NAT device 301 is used, the signaling exchange between various devices passes through the NAT device which may, and in many cases does, shield the actual IP address/port number of the actual device sending the signal and insert an IP address/port number corresponding to the NAT device itself.

In step 302 UE A 262 sends TCP SYN signal 303 directed to the SBC 266 to establish a TCP connection. The NAT device 301 receives the TCP SYN signal 303 in step 304. In step 306 the NAT device 301 generates a TCP SYN signal 303' to establish the TCP connection with the TCP SYN signal 303' including a NAT device 301 assigned IP address, e.g., IP-1, and port number, e.g., port-1. In some situations the assigned IP address is the NAT device's IP address and port number that the NAT device 301 is using to forward signals from UE A 262 directed to other devices. This IP address (IP-1) and port number (port-1) is indicated as the IP address/port combination corresponding to the source device, e.g., UE A 262, in the signals from UE A 262 going via the NAT device 301. Further in step 306 the NAT device 301 sends the TCP SYN signal 303' to the SBC 266. In step 308 the SBC 266 receives and processes the TCP SYN signal 303'. In some embodiments the IP address and port number used in the TCP SYN 303' sent towards the SBC 266 is not the actual IP address/port pair used by UE A 262 but is seen by the SBC 266 as corresponding to the source address. Thus a device, e.g., SBC 266, that receives signal 303' would perceive IP-1 and port number port-1 as corresponding to the UE A 262 and would perceive signals coming from IP address IP-1 and port number port-1 as coming from UE A 262. Arrow 309 indicates that the TCP connection is established between UE A 262 and the SBC 266. As part of the TCP connection establishment one or more additional signals such as SYN ACK and TCP ACK may be exchanged.

In step 310 UE A 262 sends a registration request 311, e.g., directed to a SIP registrar, over the established TCP connection. The NAT device 301 receives the registration request 311 in step 312. In step 314 the NAT device 301 generates a registration request 311' by including the IP address (IP-1) and port number (port-1) in a header of registration request 311. Further in step 314 the NAT device 301 sends the registration request 311' to the SBC 266 which receives the registration request 311' in step 316 and in turn forwards the registration request to the SIP registrar. Upon successful registration, the registrar sends back a SIP 200 response 319 indicating successful registration to UE A via the SBC 266 and NAT device 301 which is finally received by the UE A as SIP 200 response 319' in step 324. The SBC forwards (step 318) the SIP 200 response 319 to UE A which goes through the NAT device 301 (steps 320, 322).

Steps 326 through 348 illustrate similar signaling relating to establishing a TCP connection for registration of UE B 264. In step 326 UE B 264 sends TCP SYN signal 327 directed to the SBC 266 to establish a TCP connection. The NAT device 301 receives the TCP SYN signal 327 in step 328. In step 330 the NAT device 301 generates a TCP SYN signal 327' to establish the TCP connection with the TCP SYN signal 327' including a NAT device inserted IP address, e.g., IP-1, and port number, e.g., port-2. Further in step 330 the NAT device 301 sends the TCP SYN signal 327' to the SBC 266. In step 332 the SBC 266 receives and processes the TCP SYN signal 327'. As part of the TCP connection establishment one or more additional signals such as SYN ACK and TCP ACK may be exchanged. Arrow 333 indicates that the TCP connection is established between UE B 264 and the SBC 266.

In step 334 UE B 264 sends a registration request 335, e.g., directed to the SIP registrar, over the established TCP connection for UE B 264. The NAT device 301 receives the registration request 334 in step 336. In step 338 the NAT device 301 generates a registration request 335' by including the IP address (IP-1) and port number (port-2) in a header of registration request 335. Further in step 336 the NAT device 301 sends the registration request 335' to the SBC 106 which receives the registration request 335' in step 340 and in turn forwards the registration request to the SIP registrar. Upon successful registration, the registrar sends back a SIP 200 response indicating successful registration to UE B 264 via the SBC 266 (step 342) and NAT device 301 which is finally received by the UE B 264 in step 348. The SBC 266 forwards (step 342) the SIP 200 response 343 from the registrar to UE B 264 as signal 200 343' which goes through the NAT device 301 (steps 344, 346) before reaching UE B 264 in step 348.

Now consider that UE A 262 wants to access a service, e.g., establish a call, and for this the UE initiates a new TCP connection rather than using the established TCP connection used for registration. This occurs in a number of cases where devices communicate using SIP. In fact some devices establish a new TCP connection for each call they place. In step 350 UE A 262 again initiates signaling exchange to establish a new TCP connection by sending a TCP SYN signal 351. The NAT device 301 receives the TCP SYN signal 351 in step 352. In step 354 the NAT device generates a TCP SYN signal 351' to establish the TCP connection for UE B 264, by including a NAT device inserted IP address, e.g., IP-1, and port number, e.g., port-3. Further in step 354 the NAT device 301 sends the TCP SYN signal 351' to the SBC 266 which receives it in step 356. Arrow 357 indicates that the new TCP connection is established between UE A 262 and the SBC 266.

In step 358 UE A 262 sends an INVITE signal 359, e.g., directed to the registrar/application server, over the new TCP connection. The NAT device 301 receives the INVITE 359 in step 360. In step 362 the NAT device generates a INVITE 359' by including the IP address (IP-1) and port number (port-3) in a header of INVITE signal 359'. Note that while the NAT device used the same IP address (IP-1) for the INVITE 359', the source port number for the INVITE 359 is different from the one used for registration of UE A 262 in step 314 which was port-2. Further in step 362 the NAT device sends the INVITE 359' to the SBC 266 which receives the INVITE in step 364. From the perspective of SBC 266 which receives the INVITE signal 359' and sees "Port-3" as the source port of the INVITE, this INVITE signal cannot be correlated to the registration instance for UE A 262 (and thus cannot be mapped back to UE A 262) since the source port used for registration is different than the source port used for the INVITE corresponding to UE A 262. From the above illustration it can be appreciated that correlating calls to registration instances using IP address/port number is not reliable and may not work in various scenarios.

Relying on SIP Contact header content is not reliable either as UEs registering for the same AoR may be behind different NAT devices and can be assigned the same private IP Address. Furthermore, sometimes the SIP Contact header is populated with a FQDN (fully qualified domain name) value, which is not really resolving to the actual IP Address currently owned by a UE device. The issues of NAT device restart and NAT devices with multiple public IP Addresses make mechanisms utilizing source IP Address for registration/call correlation problematic. Thus such approaches which utilize IP address/port number information indicated in signals and/or SIP Contact header content to determine and match the source instance, are not reliable.

From the above discussion it should be appreciated that there is a need for improved communications methods and apparatus for correlating calls to registration instances. The need is particularly great for such improved methods and apparatus for correlating calls to registration instances in cases where multiple devices are registered using the same address of record and/or when there are multiple instances using the same address of record.

SUMMARY

The present invention is directed to various features relating to methods, systems and apparatus for correlating registrations with subsequent requests for service, e.g., calling or other services authenticating a device and/or a user attempting to access network services, e.g., calling services, through a session border controller (SBC), are described. The present invention addresses the problems described above.

Normally during registration and authentication operations performed by the Registrar an SBC just passes through relevant messages, e.g., register requests, SIP 401 challenges, SIP 200 responses etc., without modifying message content. In accordance with the features of one embodiment of the present invention, the SBC assigns a registration instance identifier to registration requests and modifies response messages from the SIP registrar to include the assigned registration instance identifier as part of an authentication header or a service route header unbeknownst to either the registrar or the devices registering with the registrar. The devices registering then receive the modified response messages and include the registration instance identifier in future requests thereby allowing the SBC to properly correlate which requests relate to which registration instances when multiple registrations have the same address of record.

In another embodiment, service requests and calls are correlated to their corresponding registrations by the SBC forking a received mid-dialog request to all registered devices with the same address of record as the destination address of record included in the mid-dialog request and determining the correct destination and registration instance based on the responses to the mid-dialog request.

In an exemplary method of operating a session border controller in accordance with an embodiment of the present invention, the method comprises receiving, at the SBC, a first registration request directed to a registrar from a first user equipment (UE) device; assigning, by the SBC, a first registration instance identifier to the first registration request; storing, in memory, information relating to the first registration request including the assigned first registration instance identifier; sending, from the SBC, a first message to said first UE device in response to the first registration request, said first message including said first registration instance identifier, receiving, by the SBC, a second message (e.g., SIP INVITE message); and determining, by the SBC, whether the second message corresponds to the first registration request based on information included in the second message.

In some embodiments, the step of determining whether the second message corresponds to the first registration request in the method includes determining that said second message corresponds to the first registration request when information included in the second message includes said first registration instance identifier. In some embodiments, the step of determining whether the second message corresponds to the first registration request in the method includes determining that the second message does not correspond to the first registration request when information included in the second message does not include the first registration instance identifier.

In some embodiments the method further includes forwarding, by the SBC, the first registration request to said registrar; receiving by the SBC, in response to said forwarded first registration request, a response message from the registrar, and prior to sending said first message to said first UE device, generating said first message using information included in said response message from said registrar. In some embodiments the response message from said registrar is a SIP 200 response message received by said SBC in response to a successful registration/authentication of said first UE device; and generating said first message using information included in said response message from the registrar includes performing one of i) adding a Service-Route header including said first registration instance identifier to said 200 response message to generate said first message, or ii) modifying an existing Service-Route header of said received 200 response message to include said first registration instance identifier. In some embodiments of the method prior to sending the first message to the first UE device, the SBC generates said first message using information included in a SIP 401 message from said registrar received by said SBC.

In some embodiments in which a SIP 401 message from the registrar is received by the SBC in response to said first registration request, the SBC adds said first registration instance identifier to an opaque parameter included in a WWW-Authenticate header of said SIP 401 message.

In some embodiments of the method the message header in which the first registration instance identifier is included by the SBC is a Service-Route header or a SIP authentication header.

In some embodiments the method includes the additional steps of receiving, at the SBC, a SIP 200 response message from the registrar in response to said first registration request, said registrar also being an application server; and generating, at the SBC, said first message, said first message being a SIP 401 message including an authentication header with an opaque parameter including said first registration instance identifier.

Another exemplary embodiment of correlating requests and calls with registrations includes a method of operating a first session border controller (SBC) to perform the steps of receiving, at said first SBC, a mid-dialog request for a first call directed to a device registered with a first address of record; forking, at said first SBC, said mid-dialog request to a plurality of currently registered devices, each device of said plurality of currently registered devices being registered with the first address of record; and determining, at said first SBC, based on a response to said forked mid-dialog request, which of said plurality of registered devices has an active dialog corresponding to the first call.

The present invention also includes communications systems and Session Border Controllers which perform the above methods.

In an exemplary communications system in accordance with one embodiment of the present invention, the communications system includes a session border controller (SBC) including a receiver configured to receive a first registration request directed to a registrar from a first user equipment (UE) device; a registration instance identifier assignment module configured to assign a first registration instance identifier to the first registration request; a storage device having stored therein said first registration request including the assigned first registration instance identifier; a transmitter configured to send a first message to said first UE device in response to the first registration request, said first message including said first registration instance identifier, said receiver further configured to receive a second message; and a determination module configured to determine whether the second message corresponds to the first registration request based on information included in the second message.

Another exemplary embodiment includes a communication system including a first Session Border Controller, the first Session Border Controller (SBC) including a first receiver configured to receive a mid-dialog request for a first call directed to a device registered with a first address of record; a first transmitter configured to fork said mid-dialog request to a plurality of currently registered devices, each device of said plurality of currently registered devices being registered with the first address of record; and a first determination module configured to determine based on a response to said forked mid-dialog request, which of said plurality of registered devices has an active dialog corresponding to the first call.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 4 illustrates the combination of FIGS. 4A and 4B.

FIG. 4A is the first part of drawing that illustrates the steps and associated signaling exchange between various devices/servers performed in an exemplary method used for correlating a registration instance with a corresponding subsequent service request, e.g., INVITE, in accordance with an exemplary embodiment.

FIG. 7 illustrates the combination of FIGS. 7A and 7B.

FIG. 12 is an exemplary information table including information that can be used to map registration instances with subsequent service requests using exemplary registration instance identifiers that are assigned in accordance with some embodiments of the invention.

FIG. 13 illustrates the combination of FIGS. 13A, 13B and 13C.

DETAILED DESCRIPTION

Figure 1:
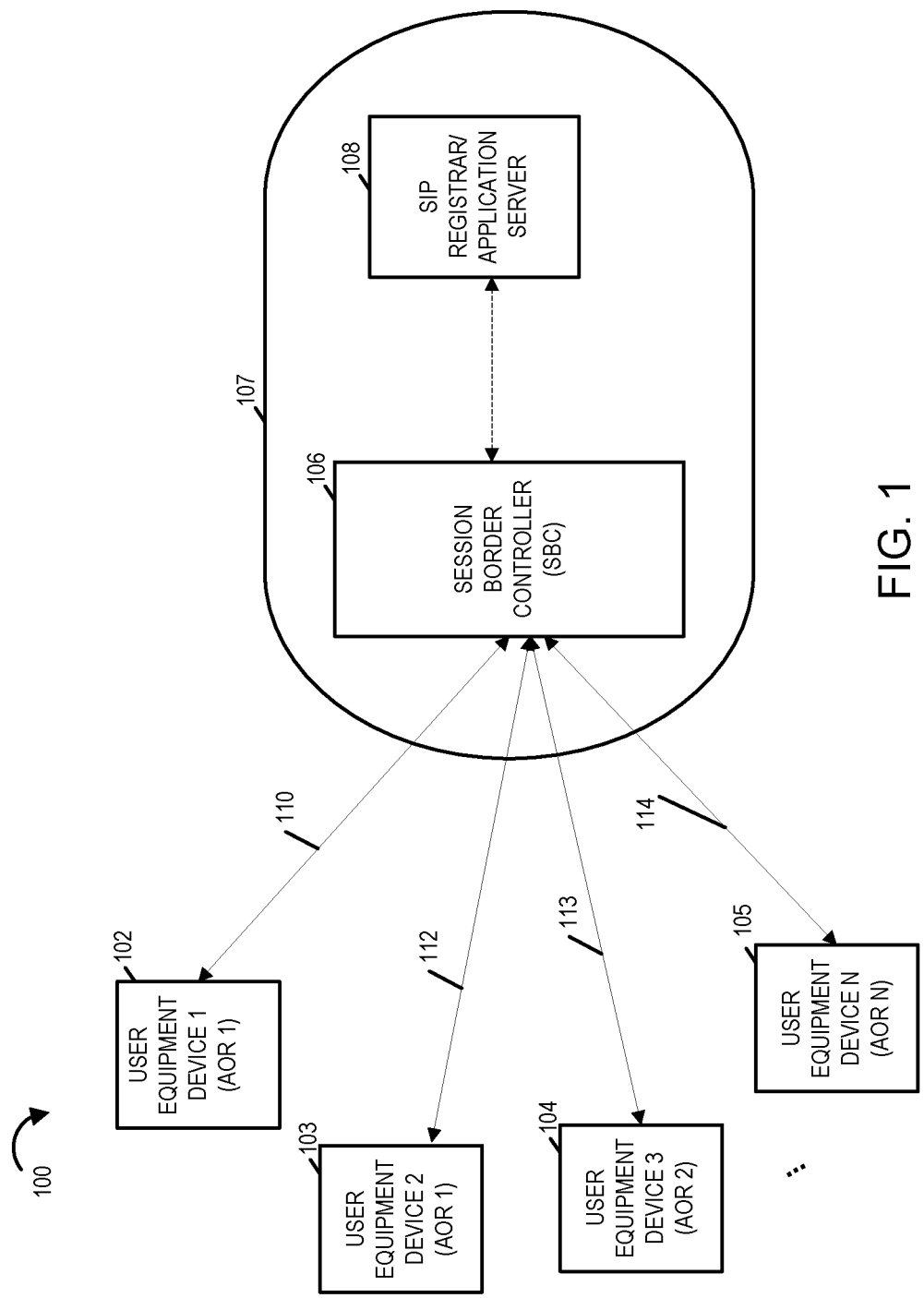
FIG. 1 illustrates an exemplary system 100 implemented in accordance with an exemplary embodiment of the invention.
Figure 2:
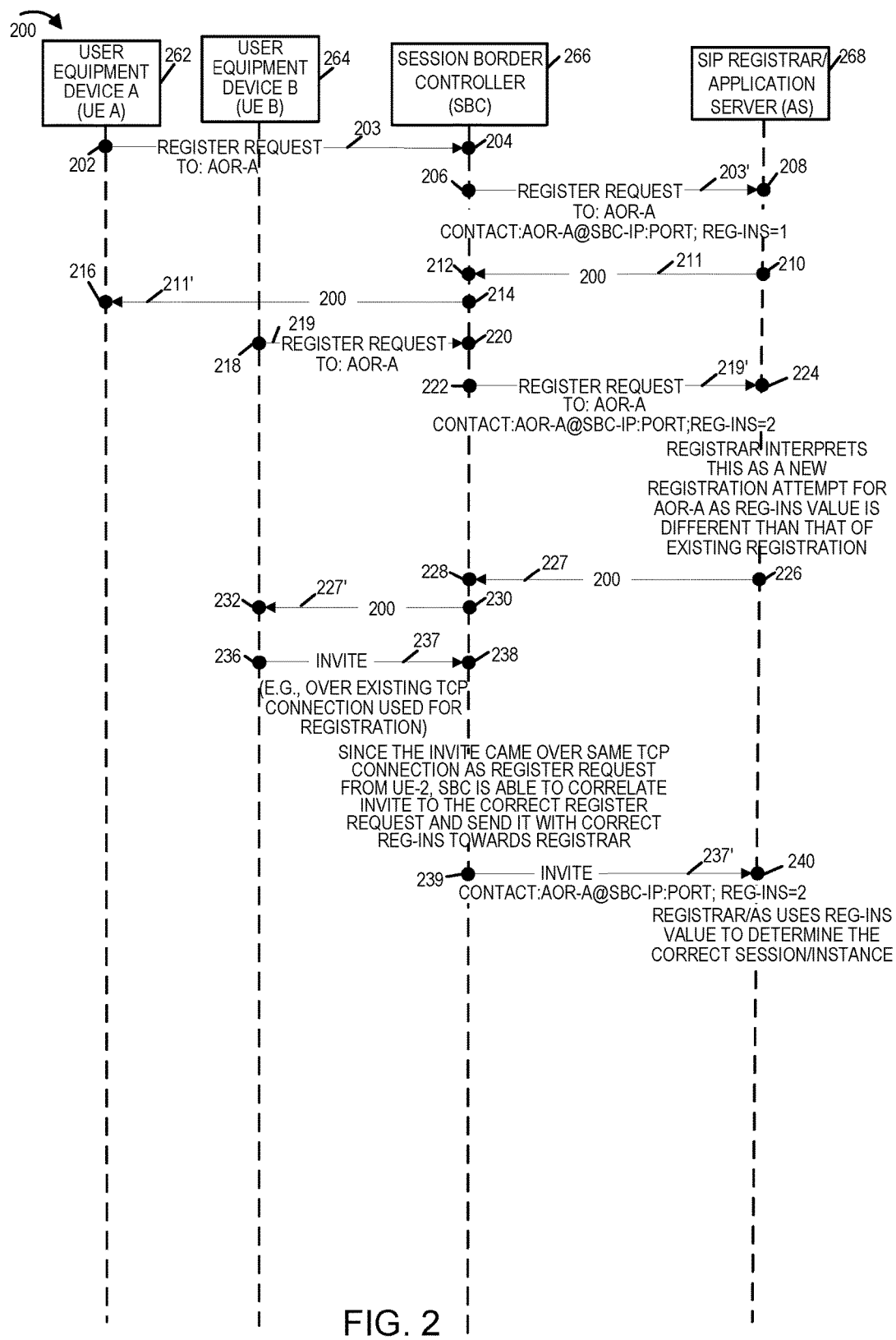
FIG. 2 illustrates an example depicting a problem that occurs in correlating a call to a corresponding registration instance when a plurality of devices register using the same address of record (AOR).
Figure 3:
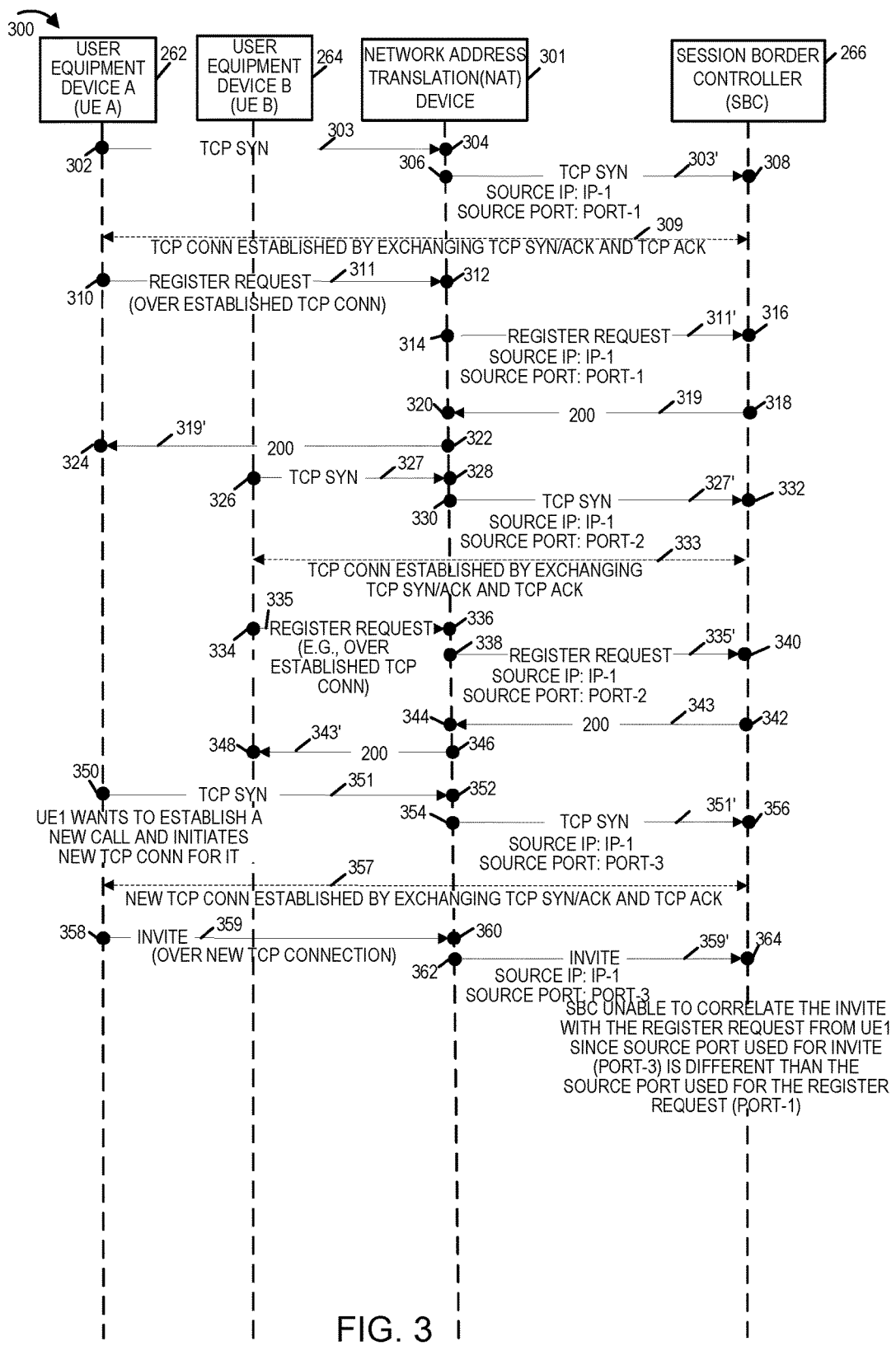
FIG. 3 illustrates another example showing deficiencies of an approach where IP address and source port number is relied upon for call-registration instance correlation in cases where a plurality of devices register using the same address of record (AOR), making this approach unreliable.

FIG. 1 illustrates an exemplary system 100 in accordance with an exemplary embodiment. System 100 includes a plurality of user equipment (UE) devices, a network 107 with network elements including a session border controller (SBC) 106 and an SIP registration server 108. The SIP registration server 108 is also referred to as the SIP Registrar or simply the registrar. In some embodiments the SIP registration server 108 also serves as an application server. In some other embodiments the network 107 includes an application server as a separate device in addition to the SIP registration server 108. The plurality of user equipment (UE) devices include user equipment device 1(UE1) 102, user equipment device 2(UE 2) 103, user equipment device 3(UE 2) 104, . . . , user equipment device N (UE N) 105. Each user equipments device may be e.g., a mobile or stationary communications device, such as a cellular phone, fixed wired phone, smartphone, tablet device, laptop computer or other communications device that supports SIP signaling and is capable of communicating over an IP network. In various embodiments various user devices such as the ones shown in FIG. 1 include a SIP user agent. The UE devices UE 1 102, UE 2 103, . . . , and UE N 105 are coupled to the SBC 106 via communication links 110, 112, 113 and 114 respectively. In various embodiments the UE devices and the SBC 106 communicate and exchange information over a communications network formed by the communications links 110, 112, 113, 114.

In some embodiments the exemplary session border controller (SBC) 106 and the SIP registration server 108 are located at an operator/service provider's site. In various embodiments the UE devices in the system 100 establish TCP (Transmission Control Protocol) connections for communicating with the SBC 106 and the SIP registration server 108.

Figure 8:
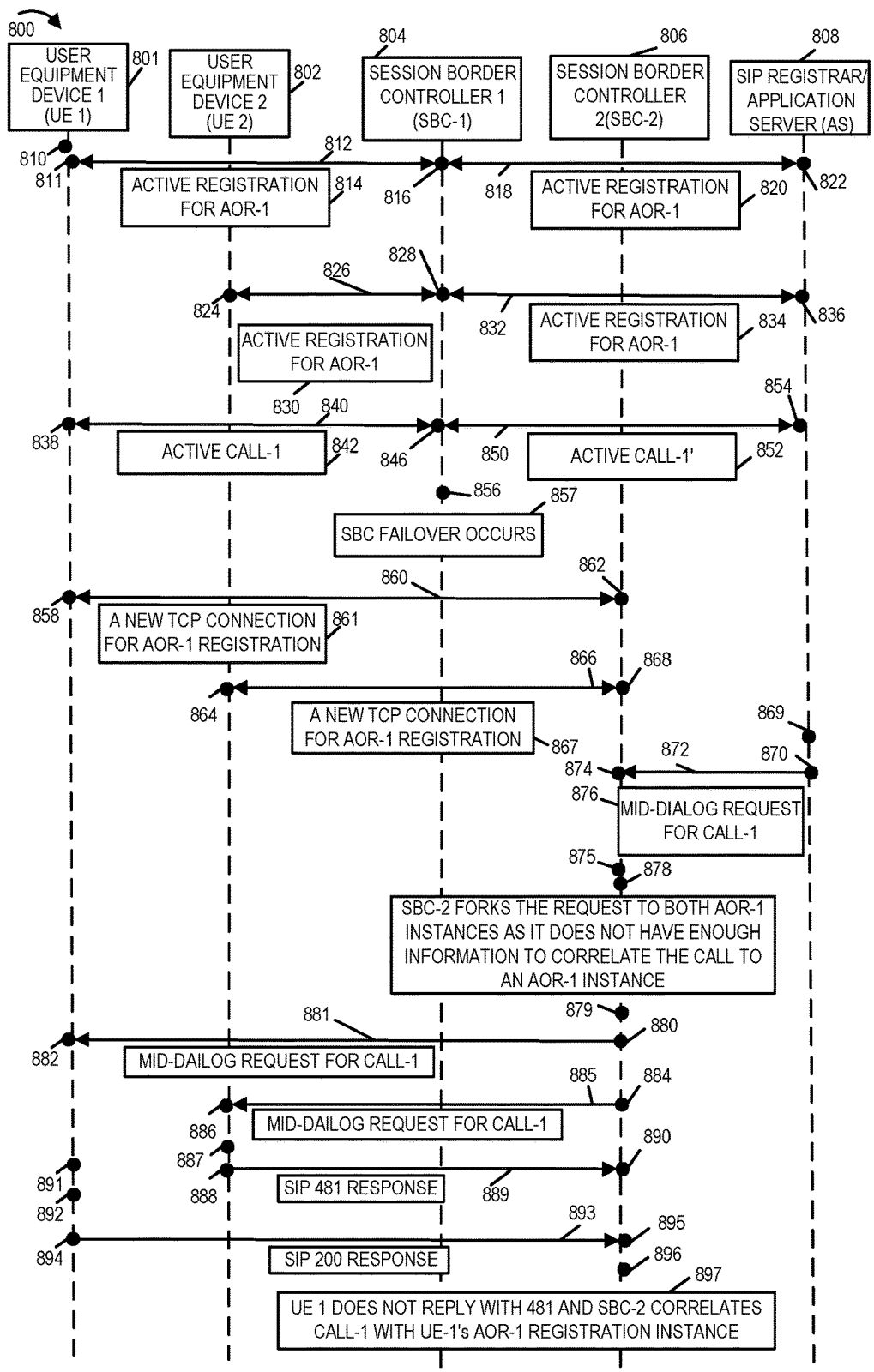
FIG. 8 is illustrating the steps and associated signaling exchange between various devices/servers performed in an exemplary method used for correlating a registration instance with a corresponding active call after a switchover event in accordance with one exemplary embodiment of the present invention.
Figure 9:
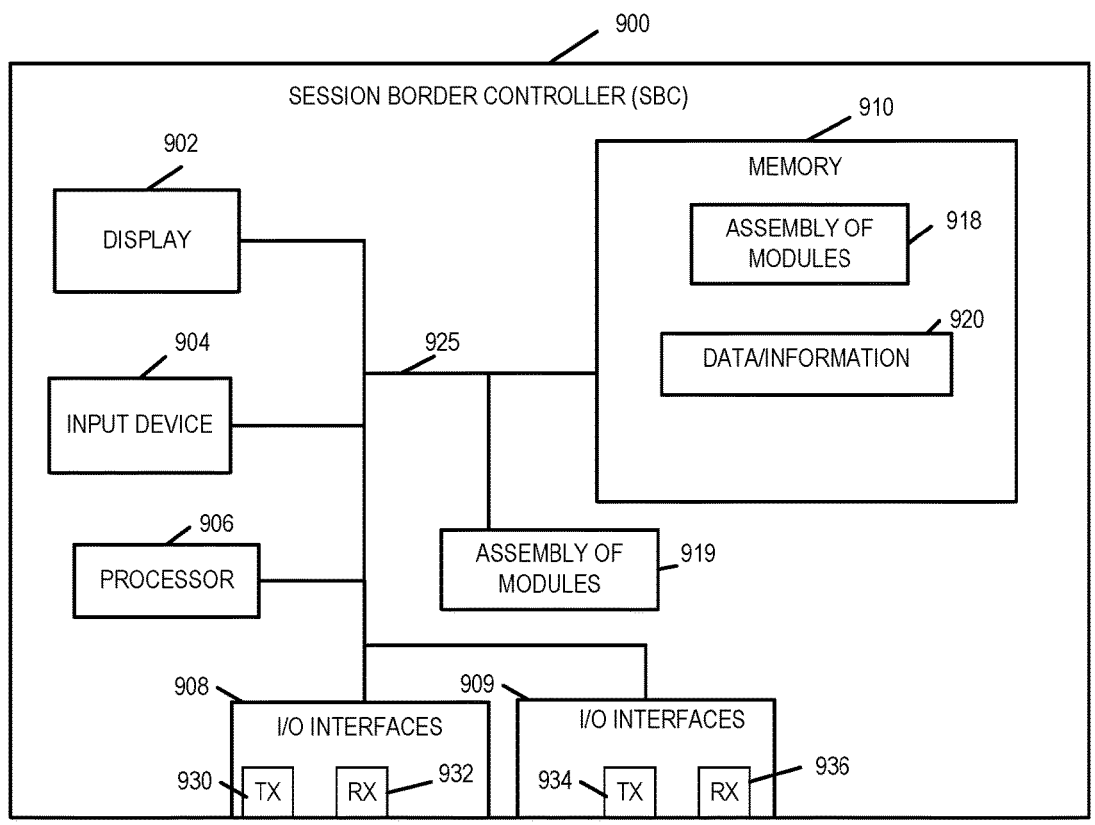
FIG. 9 illustrates an exemplary session border controller that implements the method of the present invention and can be used as the session border controller shown in FIG. 1 or any of the other figures.

FIG. 9 illustrates an exemplary embodiment of a Session Border Controller in accordance with one embodiment of the present invention. Exemplary session border controller 900 includes a display 902, an input device 904, a processor 906, e.g., a CPU, input/output (I/O) interfaces 908 and 909, which couple the SBC to a core network or various other devices including NAT devices and User Equipment devices, memory 910, and an assembly of modules 919, e.g., circuits corresponding to different modules, coupled together via a bus 925 over which the various elements may interchange data and information. Memory 910 includes an assembly of modules 918, e.g., an assembly of software modules, and data/information 920. The I/O interface 908 includes transmitters 930 and receivers 932. The I/O interface 909 includes transmitters 934 and receivers 936. The I/O interfaces in some embodiments are configured to communicate in accordance with the Transport Control Protocol and Session Initiation Protocol. In some embodiments, the SBC 900 includes a communication module configured to operate using TCP and SIP protocol signaling methods. In some embodiments, the communication module is a hardware module, a software module or a module including hardware and software components. In some embodiments, SBC 106 of FIGS. 1, 4, 5, 6 and 8 is SBC 900 of FIG. 9.

Figure 10:
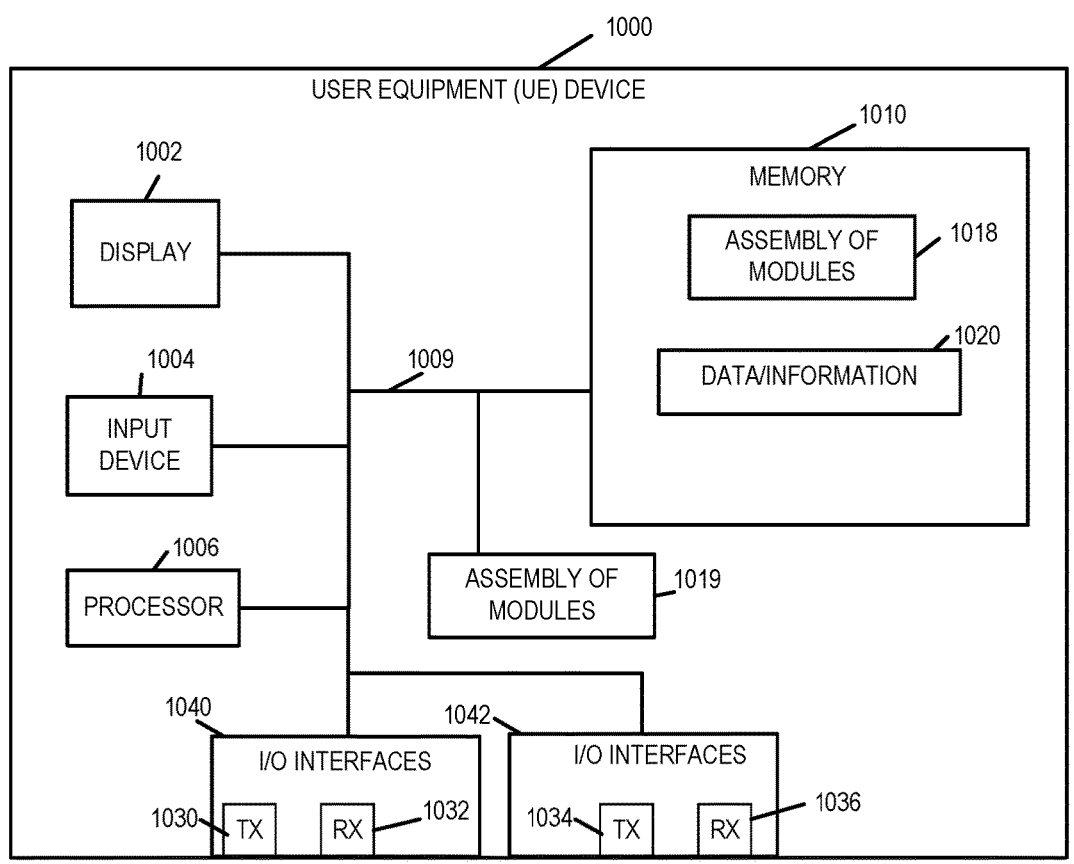
FIG. 10 illustrates an exemplary embodiment of a user equipment (UE) device in accordance with one embodiment of the present invention.

FIG. 10 illustrates an exemplary embodiment of a User Equipment (UE) device in accordance with one embodiment of the present invention. Exemplary user equipment device 1000 includes a display 1002, an input device 1004, a processor 1006, e.g., a CPU, input/output (I/O) interfaces 1040 and 1042, which couple the UE to a core network or various other devices including NAT devices and SBC devices, memory 1010, and an assembly of modules 1019, e.g., circuits corresponding to different modules, coupled together via a bus 1009 over which the various elements may interchange data and information. Memory 1010 includes an assembly of modules 1018, e.g., an assembly of software modules, and data/information 1020. The I/O interface 1040 includes transmitters 1030 and receivers 1032. The I/O interface 1042 includes transmitters 1034 and receivers 1036. The I/O interfaces in some embodiments are configured to communicate in accordance with the Transport Control Protocol and Session Initiation Protocol. In some embodiments, the UE 1000 includes a communication module configured to operate using TCP and SIP protocol signaling methods. In some embodiments, the communication module is a hardware module, a software module or a module including hardware and software components. In some embodiments, the user equipment devices of UE 1, UE 2, UE 3, . . . , UE N of FIGS. 1, 4, 5, 6 and 8 are implemented in accordance with user device 1000 of FIG. 10. In some embodiments, user equipment device includes one or more receiver modules for receiving SIP messages, transmitter modules for transmitting SIP messages, a memory storage control module for managing storage of data and message information, and message generation module for generating messages such as SIP messages.

Figure 11:
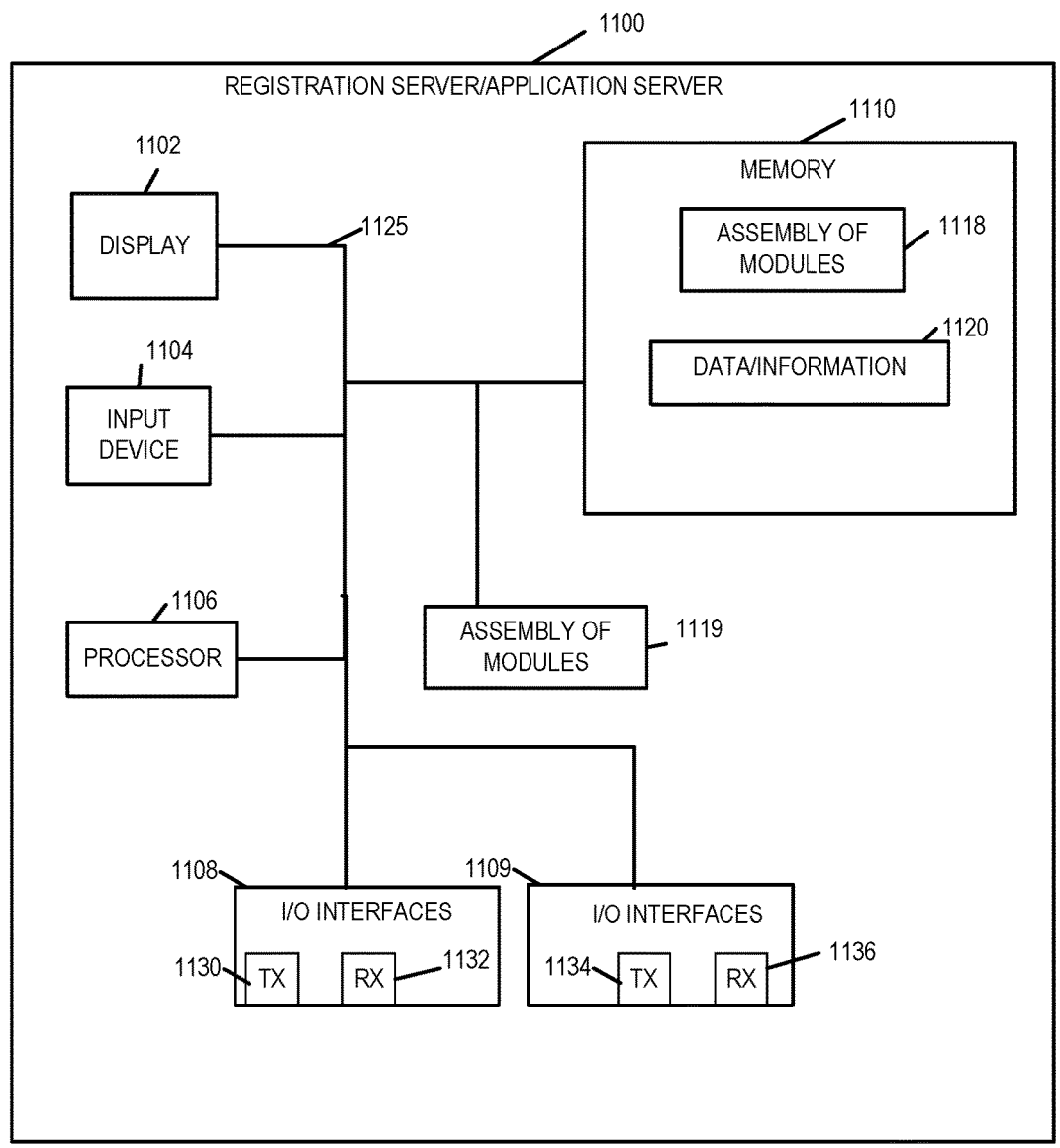
FIG. 11 illustrates an exemplary Registration/Application server, e.g., a SIP registrar/application server, implemented in accordance with one embodiment of the present invention.

FIG. 11 illustrates an exemplary embodiment of a Registration Server/Application Server device in accordance with one embodiment of the present invention. Exemplary registration server/application server device 1100 includes a display 1102, an input device 1104, a processor 1106, e.g., a CPU, input/output (I/O) interfaces 1108 and 1109, which couple the registration server/application server to a core network or various other devices including NAT devices, SBC devices, and User Equipment, memory 1110, and an assembly of modules 1119, e.g., circuits corresponding to different modules, coupled together via a bus 1125 over which the various elements may interchange data and information. Memory 1110 includes an assembly of modules 1118, e.g., an assembly of software modules, and data/information 1120. The I/O interface 1108 includes transmitters 1130 and receivers 1132. The I/O interface 1109 includes transmitters 1134 and receivers 1136. The I/O interfaces in some embodiments are configured to communicate in accordance with the Transport Control Protocol and Session Initiation Protocol. In some embodiments, the registration server/application server 1100 includes a communication module configured to operate using TCP and SIP protocol signaling methods. In some embodiments, the communication module is a hardware module, a software module or a module including hardware and software components. In some embodiments, the registration server 108 of FIGS. 1, 4, 5, 6, and 8 is registration server device 1100 of FIG. 11 sometimes also referred to as a registrar or SIP registrar. In some embodiments, the registrar device includes one or more receiver modules for receiving SIP messages, transmitter modules for transmitting SIP messages, an authentication module for authenticating messages, a memory storage control module for managing storage of data and message information, and a message generation module for generating messages such as SIP messages.

During normal operation in an SIP network a user device, such as for example UE 1 102 or any of the UE devices of system 100, registers with the network before the device can request service(s), e.g., place and/or receive calls. As part of a registration process a user device sends a registration request to the SIP registration server 108 that registers the user device with the network and facilitates call establishment. In some embodiments a user may operate and register multiple devices, e.g., UE 1 102 and UE 2 103, using the same address of record (AOR) since Session Initiation Protocol (SIP) allows multiple registrations for the same AOR. For example a user may operate both UE 1 102, e.g., a smartphone, and UE 2 103, e.g., an iPAD. The user can, and in some embodiments does, register both devices with a registrar/application server using the same address of record for both UE 1 102 and UE 2 103, e.g., AOR1. The other UE devices UE 3, 104, . . . , UE N 105 in the system may be registered with other AORs corresponding to the users operating these devices. Since there are multiple devices registered with the same AOR, in this case UE 1 102 registered with the same address of record, e.g., AOR1, as UE 2 103, requests for services from the network being received by a SBC to be forwarded to the registrar/application server need to be correlated with the correct registered instance requesting the service. This is because without such a determination the SBC does not know whether the service request corresponds to UE 1 102 or UE 2 103 since both are registered with the same address of record and use "AOR1" as the address of record in the registration request and/or service requests so that the SBC can properly determine which instance of a registration is making a request and to which instance messages responding to the request need to be directed.

Figure 4B:
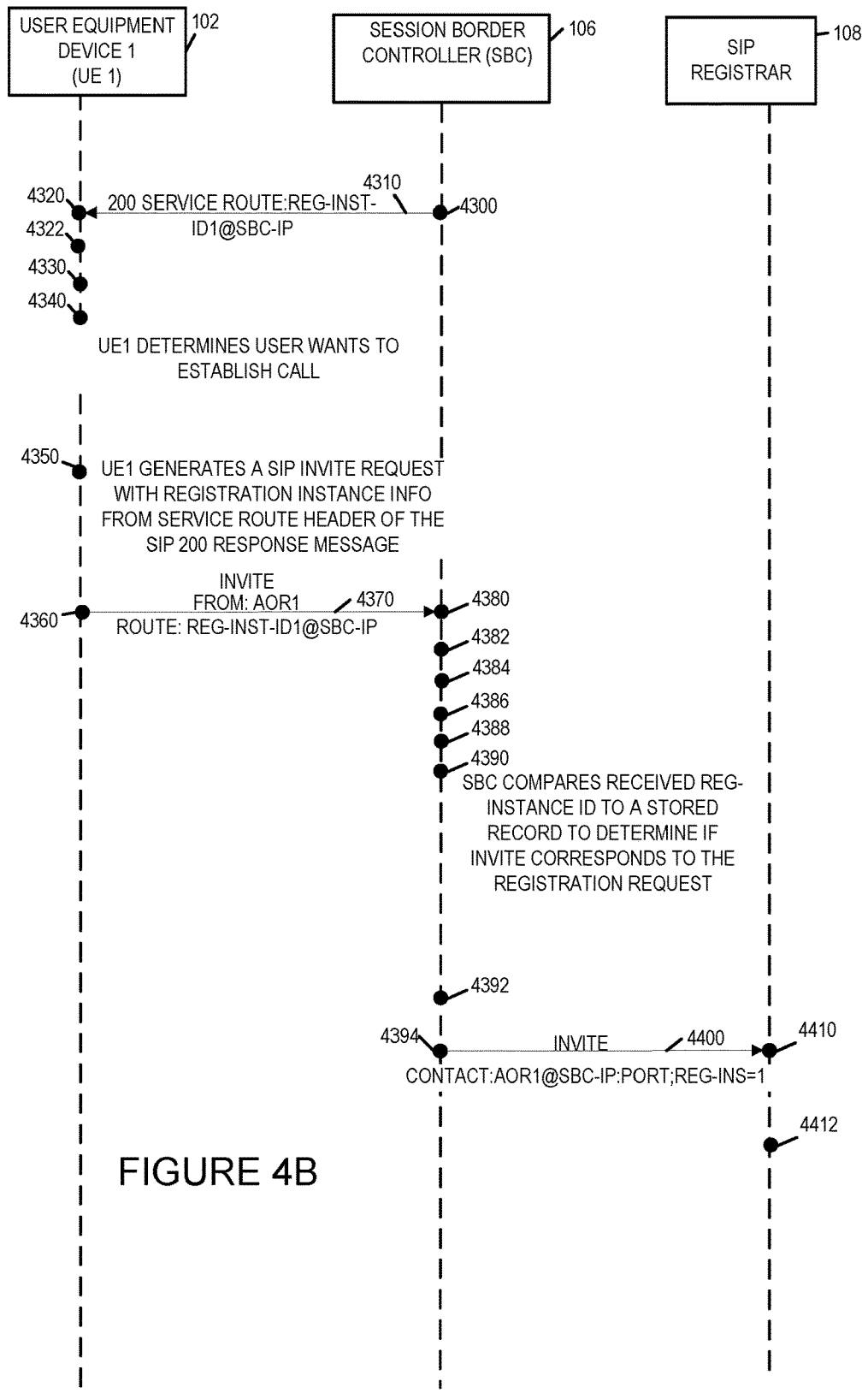
FIG. 4B is the second part of a drawing that illustrates the steps and associated signaling exchange between various devices/servers performed in an exemplary method used for correlating a registration instance with a corresponding subsequent service request, e.g., INVITE, in accordance with an exemplary embodiment.

An exemplary communications method to correlate service requests, e.g., requests to initiate Voice Over Internet Protocol calls, to corresponding registration instances is illustrated in diagram 4000 of FIG. 4 along with the signaling used to implement the method. In FIG. 4, the exemplary method 4000 is implemented using exemplary system 100 of FIG. 1. Elements or steps with the same reference numbers used in different figures are the same or similar and those elements or steps will not be described in detail again.

In method 4000 the Service-Route header is used to send registration specific data, i.e., registration instance identification information, to the user equipment device. As per IETF standards, the UE needs to populate any SIP dialog initiating request with a SIP Route header whose value is taken from the SIP Service-Route received at the UE in a SIP 200 response to the UE's registration request. According to the IETF standards, the SIP Service-Route is used for intermediaries to insert themselves into the call signaling path. In this exemplary embodiment of the invention, the Service-Route is used in a way that does not conform with the IETF standards. Instead of including routing information it includes registration instance identification information. However, the manner in which the Service-Route departs from the IEFT standards is limited to procedures in the SBC. The UE processes the Service-Route information which includes the registration instance identification information in accordance with the IETF standards. In this way, the SBC is able to determine between registrations for different instances for the same address of record so that it can direct calls to the correct instance and apply services as needed.

The method 4000 will now be explained in connection with the steps of the signaling diagram shown in FIG. 4. For explanatory purposes simplified SIP request and response messages are depicted with the messages and information, e.g., headers, contained therein illustrated which are most pertinent to explaining the present embodiment of the invention. As it will be appreciated additional information and formatting of the messages as well as the use of additional messages may be and typically is used in registering and requesting services such as initiating a Voice Over Internet Protocol call session.

Method 4000 begins in start step 4010. Operation proceeds from start step 4010 to step 4020. Operation proceeds from start step 4010 to step 4012. In step 4012, user equipment device 1 (UE 1) 102 generates a SIP register request 4030. Operation proceeds from step 4012 to step 4020. In step 4020, UE 1 102 sends SIP register request 4030 to Session Border Controller (SBC) 106. The SIP register request 4030 includes a To header with an address of record AOR1. The SIP register request is directed to SIP Registrar 108 which may be, and in some embodiments is, a Registrar and Application Server. Operation proceeds step 4020 to step 4040.

In step 4040 SBC 106 receives SIP register request 4030. Operation proceeds from step 4040 to step 4042. In step 4042, SBC 106 processes the register request 4030. Operation proceeds from step 4042 to step 4050. In step 4050, SBC 106 generates SIP register request 4030'. Operation proceeds from step 4050 to step 4060. In step 4060, SBC 106 sends SIP register request 4030' to SIP Registrar 108. SIP register request 4030' includes a To header including AOR1 and a CONTACT header. The CONTACT header is CONTACT:AOR1@SBC-IP; PORT; REG-INS=1. The registration instance field REG-INS=1 of the CONTACT header indicates to the SIP REGISTRAR 108 that this is the first registration instance from the address of record AOR1. The SIP REGISTRAR 108 uses the assigned REG-INS value to identify future requests from the AOR1 address of record. Operation proceeds from step 4060 to step 4080. In step 4080, SIP REGISTRAR 108 receives the SIP register request 4030'. Operation proceeds from step 4080 to step 4090. In step 4090, SIP REGSTRAR 108 processes the SIP register request 4030'. Operation proceeds from step 4090 to step 4095. In step 4095, the SIP REGISTRAR 108 generates a SIP 401 unauthorized response message 4110. Operation proceeds from step 4095 to step 4100. In step 4100, the SIP REGISTRAR 108 sends the SIP 401 response to the SBC 106 in response to the Register Request 4030'. Operation proceeds from step 4100 to step 4120.

In step 4120, SBC 106 receives the SIP 401 response message 4110 from SIP REGISTRAR 108. Operation proceeds from step 4120 to step 4122. In step 4122, SBC 106 processes the SIP 401 response message. Operation proceeds from step 4122 to step 4130. In step 4130, SBC 106 generates a SIP 401 response message 4110' based on SIP 401 response message 4110. Operation proceeds from step 4130 to step 4140. In step 4140, SBC 106 sends the SIP 401 response message 4110' to UE 1 102. Operation proceeds from step 4140 to step 4160.

In step 4160, UE 1 102 receives the SIP 401 response message 4110'. Operation proceeds from step 4160 to step 4162. In step 4162, UE 1 102 processes the SIP 401 response message 4110' and determines that it is a SIP 401 unauthorized response to the registration request message 4030. Operation proceeds from step 4162 to step 4170. In step 4170, UE 1 102 in response to receiving the SIP 401 unauthorized response generates SIP Register Request message 4190. Register Request message 4190 includes credentials and a To header including the address of record AOR1. Operation proceeds from step 4170 to step 4180. In step 4180, UE 1 102 sends the SIP Register Request with credentials message 4190 to SBC 1 in response to the receipt of the SIP 401 4110' message. In doing so, UE 1 102 is retrying the Register Request 4030 but with credentials. Operation proceeds from step 4180 to step 4200.

In step 4200, SBC 106 receives the SIP Register Request message 4190. Operation proceeds from step 4200 to step 4202. In step 4202, SBC 106 processes SIP Register Request 4190. Operation proceeds from step 4202 to step 4210. In step 4210, SBC 106 generates SIP Register Request with credentials 4190' based on SIP Register Request message 4190. The SIP Register Request message 4190' includes credentials, a To header including AOR1 and a CONTACT header. The CONTACT header is CONTACT:AOR1@SBC-IP; PORT; REG-INS=1. As previously explained, the registration instance field REG-INS=1 of the CONTACT header indicates to the SIP REGISTRAR 108 that this is the first registration instance from the address of record AOR1. Operation proceeds from step 4210 to step 4220. In step 4220 SBC 106 sends the SIP Register Request message 4190' to SIP Registrar 108 in response to the SIP 401 unauthorized response message 4110. Operation proceeds from step 4220 to step 4240. In step 4240, SIP Registrar 108 receives the SIP Register Request message 4190'. Operation proceeds from step 4240 to step 4242.

In step 4242, SIP Registrar 108 processes SIP Register Request message 4190'. Operation proceeds from step 4242 to step 4250. In step 4250, SIP Registrar 108 authenticates that the credentials included in SIP Register Request message 4190' are valid. Operation proceeds from step 4250 to step 4252. In step 4252, SIP Registrar 108 generates SIP 200 message 4270. Operation proceeds from step 4252 to step 4260. In step 4260, SIP Registrar 108 sends SIP 200 message 4270 to SBC 106 in response to SIP Register Request message 4190'. Operation proceeds from step 4260 to step 4280.

In step 4280, SBC 106 receives SIP 200 message 4270. Operation proceeds from step 4280 to step 4282. In step 4282, SBC 106 determines that the registration for AOR1 has been successfully authenticated. Operation proceeds from step 4282 to step 4290. In step 4290, SBC 106 assigns a registration instance identifier to the registration request. In this example, the REG-INST-ID1 is assigned to the registration request from UE 1. Operation proceeds from step 4290 to step 4292. In step 4292, SBC 106 stores the assigned registration instance identifier, in memory in a record and associates it with the corresponding registration request and the address of record included in the registration request. In some embodiments, the registration instance identifier is also associated with the device from which registration request was received. Operation proceeds from step 4292 to step 4294. In step 4294, SBC 106 generates SIP response message 4310 which is a response to the SIP register request message 4190. The SIP 200 response message 4310 is based upon the SIP response message 4270 and includes the registration instance identifier assigned by SBC 106 in step 4290. In this example, SBC 106 generates the SIP response message 4310 by adding a service route header with the assigned registration instance identifier to the SIP 200 message 4270. While Internet Engineering Task Force (IETF) standards state that the Service-Route is to be used for the intermediaries to insert themselves into the call signaling path in this case, the Service-Route is used in a way different from the intended purpose as proscribed by the IETF standard. The Service-Route is populated with the registration instance identifier. Even though the Service-Route included in the Service-Route header is not a service route the SBC is the only device that will modify its procedures in dealing with the Service-Route header. The user equipment device will treat the registration instance identifier as a Service-Route in accordance with the standards. In this way only the SBC is aware of the use of the Service-Route header in a way that does not comply with the IETF standards. The SIP response message 4310 includes 200 Service Route: REG-INST-ID1@SBC-IP. Operation proceeds from step 4294 to step 4300.

In step 4300, SBC 106 sends the SIP 200 response message including the service route header with the assigned registration instance identifier to UE 1 102 in response to the SIP register request 4190. Operation proceeds from step 4300 to step 4320.

In step 4320, UE 102 receives the SIP 200 response message 4310. Operation proceeds from step 4320 to step 4322. In step 4322, UE 1 102 processes the SIP 200 response message 4310 and determines that the registration has been successful and stores the service route header in memory for use in future requests. The UE 1 102 treats the registration information in the service route header as a regular service route. Operation proceeds from step 4322 to step 4330.

In step 4330, UE 1 102 detects user input. Operation proceeds from step 4330 to step 4340. In step 4340, UE 1 102 determines that the user wishes to establish a call based on the detected user input. Operation proceeds from step 4340 to step 4350. In step 4350, UE 1 102 generates a SIP Invite message 4370. As per the IETF standards, the UE 1 102 is required to populate any dialog initiating request with a Route header whose value is taken from the Service-Route received in the 200 response responding to the UE's SIP Register request. In this example, the SIP Invite is such a dialog initiating request. The generated SIP Invite message 4370 includes FROM header with the address of record AOR1 and a Route header with the registration instance identifier received in the SIP 4310 response message. The UE 1 102 when generating the SIP Invite message 4370 includes Route: REG-INST-ID1@SBC-IP as per IETF standards. Operation proceeds from step 4350 to step 4360. In step 4360, the SIP Invite message 4370 is sent to SBC 106. Operation proceeds from step 4360 to step 4380.

In step 4380, SBC 106 receives the SIP Invite message 4370. Operation proceeds from step 4380 to step 4382. In step 4382, SBC 106 processes SIP Invite message 4370. Operation proceeds from step 4382 to step 4384. In step 4384, SBC 106 extracts the registration instance identifier from the route header. Operation proceeds from step 4384 to step 4386. In step 4386, SBC 106 uses the extracted registration instance identifier REG-INST_ID1 to locate the registration instance identifier in memory and information corresponding to the extracted registration instance identifier. Operation proceeds from step 4386 to step 4388.

In step 4388, SBC 106 obtains from memory the address of record stored in memory corresponding to the registration instance identifier REG_INST_ID1 which in this case is AOR1. Operation proceeds from step 4388 to step 4390. In step 4390, SBC 106 compares the AOR1 value retrieved from memory with the address of record included in the SIP Invite message 4370. In this case, the address of record matches as both are AOR1. In this way, SBC 106 has determined/verified which SIP registration instance the SIP Invite message 4370 corresponds to. The SBC 106 can now perform any other relevant procedures now that the correct registration instance has been identified. The procedure performed in this example is to use the right instance identifier to generate a SIP Invite message with the correct instance identifier in the Contact header to send to the SIP Registrar 108. Operation proceeds from step 4390 to step 4392.

In step 4392, SBC 106 generates SIP Invite message 4400 based on SIP invite message 4370. SIP Invite message 4400 does not include the Route header including the registration instance identifier. The SIP Invite message 4400 includes a From header, FROM: AOR1 and a Contact header. The Contact header including AOR1@SBC-IP: PORT; REG-INS=1. Operation proceeds from step 4392 to step 4394.

In step 4394, SBC 106 sends the SIP Invite message 4400 to SIP Registrar 108. In step 4410, SIP Registrar 108 which also in this example is a Application Server receives the SIP Invite message 4400. Operation proceeds from step 4410 to step 4412. In step 4412, SIP Registrar 108 processes the received SIP Invite message 4400 and does not encounter problems relating to the Route header as the Route header does not contain the registration instance identifier information as it has been removed by the SBC 106. The SIP Register 108 will then proceed with processing the request.

In this way, the SBC was able to correlate which SIP requests correspond to which SIP registrations from the same address of record.

Figure 5:
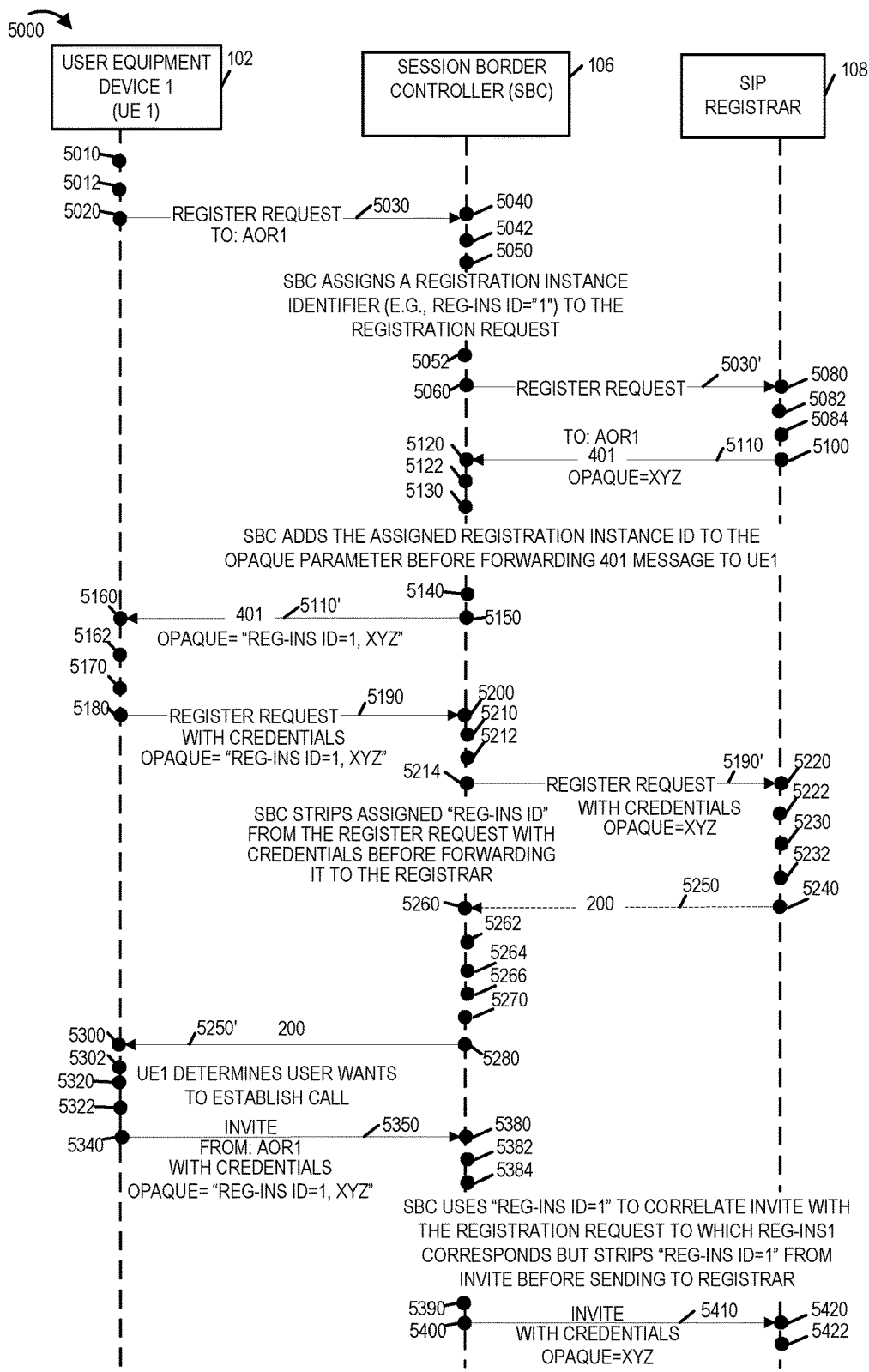
FIG. 5 illustrates the steps and associated signaling exchange between various devices/servers performed in another exemplary method used for correlating a registration instance with a corresponding subsequent service request, e.g., INVITE, in accordance with another exemplary embodiment.

FIG. 5 illustrates the steps and associated signaling exchange between various devices/servers performed in another exemplary method used for correlating a registration instance with a corresponding subsequent service request, e.g., a SIP INVITE, in accordance with another exemplary embodiment. In FIG. 5, the exemplary method 5000 is implemented using exemplary system 100 of FIG. 1. Elements or steps with the same reference numbers used in different figures are the same or similar and those elements or steps will not be described in detail again.

In method 5000, authentication of a SIP REGISTER request is performed by the Registrar 108 and the SBC 106 just passes through relevant information. The SBC 106 does not have access to the user password and hence cannot authenticate the user. In this embodiment, the SBC makes use of the opaque parameter in the WWW-Authenticate header sent by the Registrar in a SIP 401 response message and the Authorization header in SIP INVITE messages with credentials. As the Internet Engineering Task Force IETF RFC 2617 dated June 1999 explains, when a server such as the Registrar challenges a request it sends a "401 Unauthorized" message with a WWW-Authenticate header. The Authenticate header may include a variety of parameters one of which is an opaque parameter. The opaque parameter is defined as a string of data, specified by the server, which should be returned by the client unchanged in the Authorization header of subsequent requests with URIs in the same protection space. Contrary to the IETF RFC standard, the exemplary embodiment of the method 5000 uses the opaque parameter not solely for authentication purposes as intended and specified by the IETF but uses it for including registration instance information so that the SBC can correlate which registration instance a request was received from.

This mechanism provides a solution for correlating registration instances with subsequent requests for service when there are multiple registrations having the same address of record and the UE sends a SIP request such as a SIP INVITE directly with credentials and the corresponding SIP REGISTER request was challenged. Furthermore, this mechanism provides a way to improve server efficiency in handling such cases.

In some embodiments if the SIP Registrar 108 challenges both SIP REGISTER and INVITE requests, SBC 106 adds registration instance information to the opaque parameter toward the UE 1 and then removes it when relaying the request with credentials toward the Registrar 108. In this way the opaque parameter can be used by the Registrar for its intended purpose of authentication but can also be used by the SBC for the purpose of tracking and identifying registration instances corresponding to the same address of record. This mechanism allows the SBC to differentiate between registrations for different instances for the same address of record so that it can direct calls to the correct instance and apply services as needed.

The method 5000 will now be explained in connection with the steps of the signaling diagram shown in FIG. 5. For explanatory purposes simplified SIP request and response messages are depicted with the messages and information, e.g., headers, contained therein illustrated which are most pertinent to explaining the present embodiment of the invention. As it will be appreciated additional information and formatting of the messages as well as the use of additional messages may be and typically is used in registering and requesting services such as initiating a Voice Over Internet Protocol call session.

Method 5000 begins in start step S010. Operation proceeds from start step S010 to step S012. In step S012, user equipment device 1 (UE 1) 102 generates a SIP Register Request message 5030. The Register Request message 5030 include a To header including the address of record AOR1. Operation proceeds from step S012 to step S020.

In step S020, UE 1 102 sends the SIP Register Request 5030 to SBC 106. Operation proceeds from step S020 to step S040. In step S040, SBC 106 receives SIP Register Request 5030. Operation proceeds from step S040 to step S042. In step S042, SBC 106 processes the SIP Register Request 5030. Operation proceeds from step S042 to step S050. In step S050, SBC 106 assigns a registration instance identifier (e.g., REG-INS="1") to the registration request. Operation proceeds from step S050 to step S052. In step S052, SBC 106 generates SIP Register Request 5030' based on the SIP Register Request message 5030. The SIP Register Request 5030' includes a To header with the address of record being AOR1. Operation proceeds from step S052 to step S060. In step S060, SBC 106 sends the SIP Register Request message 5030' to the SIP Registrar 108 which in this example is as an Application Server. Operation proceeds from step S060 to step S080.

In step S080, SIP Registrar 106 receives the SIP Register Request message 5030'. Operation proceeds from step S080 to step S082. In step S082, SIP Registrar 108 makes a determination to challenge the Register Request message 5030'. Operation proceeds from step S082 to step S084. In step S084, SIP Registrar 108 generates a SIP 401 unauthorized response message 5110 with a WWW-Authenticate header including an opaque parameter. The opaque parameter being XYZ. Operation proceeds from step S084 to step S100. In step S100, SIP Registrar 108 sends the SIP 401 response 5110 to SBC 106 in response to SIP Register Request message 5030'. Operation proceeds from step S100 to step S120.

In step S120, SBC 106 receives SIP 401 unauthorized response message 5110. Operation proceeds to step S122. In step S122, SBC 106 processes SIP 401 unauthorized response message 5110. Operation proceeds from step S122 to step S130. In step S130, SBC 106 generates SIP 401 unauthorized response message 5110' based on the SIP 401 unauthorized response message 5110. SBC 106 in generating the SIP 401 unauthorized response message 5110' adds the registration instance identifier previously assigned by the SBC to the opaque parameter of the WWW-Authenticate header of the message. The opaque parameter now includes "REG-INS ID=1, XYZ". Operation then proceeds from step S130 to step S140. In step S140, SBC stores in memory the registration instance identifier assigned and included in the opaque parameter along with the corresponding registration request instance, address of record and in some embodiments UE 1 102 device identification information. Operation proceeds from step S140 to step S150. In step S150, SBC 106 sends the SIP 401 unauthorized message 5110' to UE 1 102. Operation proceeds from step S150 to step S160. In step S160, UE 1 102 receives the SIP 401 unauthorized response 5110' with the WWW-Authenticate header including opaque parameter set to "REG-INS ID=1, XYX", that is both the original opaque parameter value and the added registration instance identification information. Operation proceeds from step S160 to step S162. In step S162, the UE 1 102 processes the SIP 401 unauthorized response 5110'. Operation proceeds from step S162 to step S170. In step S170, generates Register Request message 5190 in response to the SIP 401 response message 5110'. Register Request message 5190 includes credentials in response to the challenge received. Register Request includes an Authorization header with an opaque parameter including REG-INS ID=1, XYZ wherein REG-INS ID=1 is the registration instance identification information assigned by the SBC 106 and XYZ is the initial opaque parameter provided by the SIP Registrar 108. Operation proceeds from step S170 to step S180.

In step S180, UE 1 102 sends the SIP Register Request message 5190 with the Authorization header including the registration instance identifier information to SBC 106. Operation proceeds from step S180 to step S200. In step S200, SBC 106 receives the SIP Register Request message 5190. Operation proceeds from step S200 to step S210. In step S210, SBC 106 processes the received SIP Register Request message 5190. Operation proceeds from step S210 to step S212. In step S212, SBC 106 generates SIP Register Request message 5190' based on SIP Register Request message 5190. As part of the generation of the SIP Register Request message 5190' SBC 106 removes the assigned REG-INS ID information from opaque parameter of the SIP Register Request message 5190 and then uses the opaque parameter with the stripped out registration instance identification information in the SIP Register Request message 5190'. The Register Request message 5190' includes an Authorization header with an opaque parameter set to "XYZ" which the opaque parameter provided by the Registrar 108 in the SIP 401 unauthorized response challenge 5110 message. Operation proceeds from step S212 to step S214.

In step S214, SBC 106 sends SIP Register Request message 5190' to SIP Registrar 108. Operation proceeds from step S214 to step S220. In step S220, SIP Registrar 108 receives SIP Register Request message 5190'. Operation proceeds from step S220 to step S222. In step S222, SIP Registrar 108 processes the received SIP Register Request message 5190'. Operation proceeds from step S222 to step S230. In step S230, SIP Registrar 108 authenticates the received Register Request message 5190' and determines that the SIP Register Request is valid and authorized. Operation proceeds from step S230 to step S232. In step S232, SIP Registrar 108 generates SIP 200 response message 5250. Operation proceeds from step S232 to step S240. In step S240, SIP Registrar 108 sends the SIP 200 response message 5250 to SBC 106. Operation proceeds from step S240 to step S260. In step S260, SBC 106 receives the SIP 200 response message 5250. Operation proceeds from step S260 to step S262.

In step S262, SBC 106 processes the SIP 200 response message 5250. Operation proceeds from step S262 to step S264. In step S264, SBC 106 determines that the SIP Register Request 106 has been successful authenticated and that UE 1 102 has been successfully registered. Operation proceeds from step S264 to step S266. In step S266, SBC 106 stores the assigned registration instance identifier in memory in a record and associates it with the corresponding registration request and the address of record included in the registration request associated with the registration instance successfully registered. In some embodiments, the registration instance identifier is also associated with the device from which the registration request was received that is UE 1 102 in this example. Operation proceeds from step S266 to step S270. In step S270, SBC 106 generates SIP 200 response message 5250' based on SIP 200 message 5250. Operation proceeds from step S270 to step S280. In step S280, SBC 106 sends the SIP 200 response message 5250' to UE 1 102. Operation proceeds from step S280 to step S300.

In step S300, UE 1 102 receives the SIP 200 response message 5250'. Operation proceeds from step S300 to step S302. In step S302, UE 1 102 processes SIP 200 response message 5250' and determines that the registration request 5190 has resulted in a successful registration. Operation proceed from step S302 to step S320.

In step S320, UE 1 102 detects a user input indicating that the user wants to establish a Voice Over Internet Protocol call session. Operation proceeds from step S320 to step S322. In step S322, UE 1 102 generates a SIP Invite message 5350. SIP Invite message 5350 includes a From header including the address of record AOR1 and credentials. The credentials are included in a Authentication header. The authentication header includes an opaque parameter. The opaque parameter is set to "REG-INS ID=1, XYZ" which is the opaque parameter value received by UE 1 in the SIP 401 unauthorized response challenge including the WWW-Authenticate header with the opaque parameter set to "REG-INS ID=1, XYZ". From the perspective of user equipment device 1 102 this is just a parameter with authentication information however it actually contains the SBC 106 assigned registration instance identification information in addition to the authentication information provided by the SIP Registrar 108. Operation proceeds from step S322 to step S340. In step S340, UE 1 102 sends the SIP Invite message with credentials 5350 to SBC 106. Operation proceeds from step S340 to step S380.

In step S380, SBC 106 receives the SIP Invite message 5350. Operation proceeds from step S380 to step S382. In step S382, SBC 106 processes the SIP Invite message 5350 and extracts the registration instance identifier, REG-INS ID=1 from the opaque parameter of the SIP Invite Authentication header. Operation proceeds from step S382 to step S384. In step S384, SBC 106 uses the extracted registration instance identifier to look up in memory which registration instance the SIP Invite message 5350 corresponds to. Upon looking up the registration instance identifier, REG-INS ID=1, in memory SBC 106 obtains the corresponding record and compares the address of record AOR1 from the From header of the SIP Invite message 5350 to the address of record associated with the REG-INS ID=1. Upon confirming that the SIP Invite request message corresponds to the registration request instance resulting from the register request 5190 from UE 1 102, SBC 106 generates SIP Invite message 5410 in step S390 based on SIP Invite request message 5350. The SIP Invite message 5410 includes an Authentication header with the opaque parameter set to "XYZ". SBC 106 removes or strips the registration instance identification information from the SIP Invite 5350 message opaque parameter before using the received opaque parameter to generate the SIP Invite 5410 message. Operation proceeds from step S390 to step S400. In step S400, SBC 106 sends the SIP Invite message 5410 to the SIP Registrar 108. Operation proceeds from step S400 to step S420.

In step S420, SIP Registrar 108 receives the SIP Invite message 5410. Operation proceeds from step S420 to step S422. In step S422, SIP Registrar 108 processes the received SIP Invite message 5410 and does not encounter problems relating to the opaque parameter as the opaque parameter of the Authenticate header does not contain the registration instance identifier as it was removed by the SBC. The SIP Register 108 will then proceed with processing the request.

In this way, the SBC was able to correlate which SIP requests correspond to which SIP registrations from the same address of record. In some embodiments, SBC generation of the SIP Register Request, SIP response or SIP Invite messages includes modifying the received SIP Register Request, SIP response or SIP Invite message respectively and forwarding the modified message onto the identified target the UE or the SIP Registrar. In some embodiments, when the SIP Registrar challenges only SIP Register requests and sending an Authentication header in the SIP Invite causes problems in the SIP Registrar, the SBC can remove the entire Authentication header from the SIP Invite header before forwarding it to the SIP Registrar.

Figure 6:
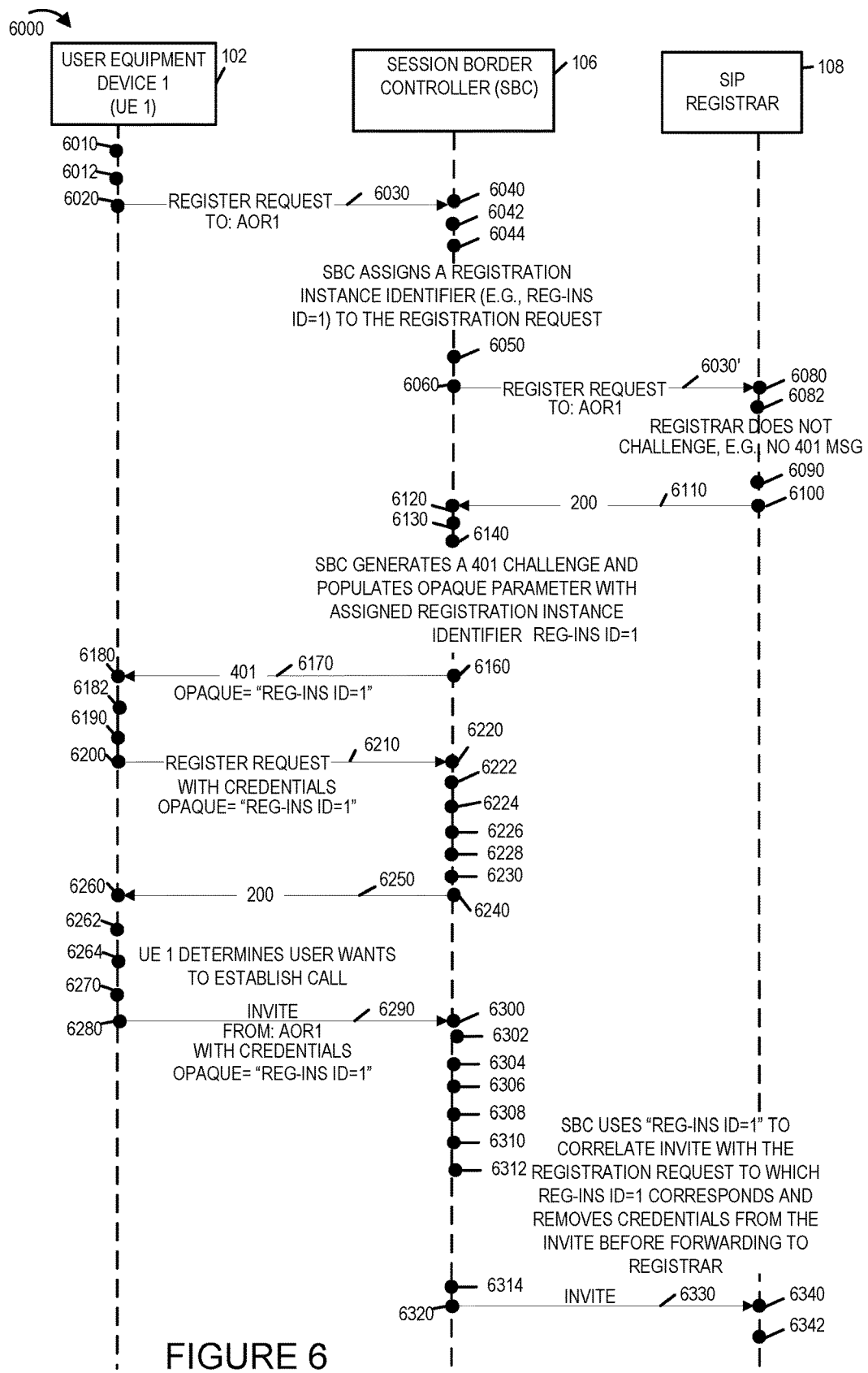
FIG. 6 illustrates the steps and associated signaling exchange between various devices/servers performed in yet another exemplary method used for correlating a registration instance with a corresponding subsequent service request, e.g., INVITE, in accordance with one exemplary embodiment.

FIG. 6 illustrates the steps and associated signaling exchange between various devices/servers performed in yet another exemplary method used for correlating a registration instance with a corresponding subsequent service request, e.g., SIP INVITE request, in accordance with one exemplary embodiment. This exemplary embodiment is similar to the exemplary method illustrated in FIG. 5 however it addresses the situation in which the SIP Registrar does not challenge SIP Register requests. In this case, the SBC initiates authentication. Note that while the SBC does not have access to the user password this is not needed as the procedure won't be used to actually verify that the UE has access to the correct password but just to use the opaque parameter to correlate a registration and a SIP Invite request relating to a call. In this example, the SIP WWW-Authenticate header, the SIP Authentication header, and the opaque parameter are used not for authentication purposes as defined in the IETF standard but are used for correlating registrations, requests, and calls.

The method 6000 will now be explained in connection with the steps of the signaling diagram shown in FIG. 6. For explanatory purposes simplified SIP request and response messages are depicted with the messages and information, e.g., headers, contained therein illustrated which are most pertinent to explaining the present embodiment of the invention. As it will be appreciated additional information and formatting of the messages as well as the use of additional messages may be and typically is used in registering and requesting services such as initiating a Voice Over Internet Protocol call session.

Method 6000 begins in start step 6010. Operation proceeds from start step 6010 to step 6012. In step 6012, user equipment device 1(UE 1) 102 generates a SIP Register Request message 6030. The Register Request message 6030 includes a To header including the address of record AOR1. Operation proceeds from step 6012 to step 6020.

In step 6020, UE 1 102 sends the SIP Register Request message 6030 to Session Border Controller 106. Operation proceeds from step 6020 to step 6040. In step 6040, SBC 106 receives the SIP Register Request message 6030. Operation proceeds from step 6040 to step 6042. In step 6042, SBC 106 processes SIP Register Request message 6030. Operation proceeds from step 6042 to step 6044. In step 6044, SBC 106 assigns a registration instance identifier to the registration request. In this example, the registration instance identifier assigned is REG-INS ID=1. Operation proceeds from step 6044 to step 6050. In step 6050, SBC 106 generates SIP Register Request 6030' based on SIP Register Request 6030. Operation proceeds from step 6050 to step 6060. In step 6060, SBC 106 sends the SIP Register Request 6030' to SIP Registrar 108. SIP Registrar 108 in this example is also an Application Server. Operation proceeds from step 6060 to step 6080.

In step 6080, SIP Registrar 108 receives SIP Register Request 6030'. Operation proceeds from step 6080 to step 6082. In step 6082, SIP Registrar 108 processes the received SIP Register Request 6030' and registers the UE 1 102 device. SIP Registrar 108 does not challenge the SIP Registrar Request 6030' but determines to send a SIP 200 response message. No SIP 401 unauthorized message is generated or sent by the SIP Registrar 108 in response to the SIP Register Request 6030'. Operation proceeds from step 6082 to step 6090. In step 6090, SIP Registrar 108 generates SIP 200 message 6110 indicating the successful registration of AOR1 in response to the SIP Register Request message 6030'. Operation proceeds from step 6090 to step 6100. In step 6100, SIP Registrar 108 sends the SIP 200 response to SBC 106. Operation proceeds from step 6100 to step 6120.

In step 6120, SBC 106 receives the SIP 200 response message. Operation proceeds from step 6120 to step 6130. In step 6130, SBC 106 processes the SIP 200 response message 6110 and determines that the SIP Register Request 6030' has been successful and that no challenge has been sent by the SIP Registrar in connection with the SIP Register Request 6030'. Operation proceeds from step 6130 to step 6140. In step 6140, SBC 106 generates a SIP 401 unauthorized response challenge 6170 to the SIP Register Request 6030 even though the SIP Register Request has been successful. The SIP 401 unauthorized response message includes a WWW-Authenticate header with an opaque parameter. The opaque parameter is populated with the registration instance identifier assigned by the SBC 106 to Register Request 6030 which in this example is REG-INS ID=1. The registration instance identifier assigned to the instance is stored in memory, e.g., in the memory of the SBC 106, along with corresponding information such as for example the address of record received with the registration request 6030 and in some embodiments identification information for the device UE 1 102 from which the registration request 6030 was received. Operation proceeds from step 6140 to step 6160. In step 6160, SBC 106 sends the SIP 401 unauthorized response message 6170 with the opaque parameter including the registration instance identifier to UE 1 102 in response to SIP Register Request message 6030. Operation proceeds from step 6160 to step 6180.

In step 6180, UE 1 102 receives the SIP 401 response message 6170. Operation proceeds from step 6180 to step 6182. In step 6182, UE 1 102 processes the SIP 401 response message and stores the opaque parameter from the WWW-Authenticate header in its memory for future use. Operation proceeds from step 6182 to step 6190. In step 6190, SBC 106 generates SIP Register Request message 6210 in response to the SIP 401 response message 6170. SIP Register Request message 6210 is based on SIP Register Request 6030 but includes credentials including a SIP Authentication header including the opaque parameter received in the SIP 401 response 6170. The opaque parameter is the registration instance identifier, REG-INS ID=1. The SIP Register Request 6210 also includes a To header with the address of record being AOR1. Operation proceeds from step 6190 to step 6200. In step 6200, UE 1 102 sends the SIP Register Request 6210 to SBC 106 in response to SIP 401 response 6170. Operation proceeds from step 6200 to step 6220.

In step 6220, SBC 106 receives the SIP Register Request 6210. Operation proceeds from step 6220 to step 6222. In step 6222, SBC 106 processes SIP Register Request 6210. Operation proceeds from step 6222 to step 6224. In step 6224, SBC 106 identifies and extracts the registration instance identifier from the opaque parameter of the Authentication header of the SIP Register Request 6210 message. Operation proceeds from step 6224 to step 6226. In step 6226, SBC 106 uses the registration instance identifier extracted, REG-INS ID=1, to look up the registration instance in memory and obtain the corresponding address of record. Operation proceeds from step 6226 to step 6228. In step 6228, SBC 106 compares the address of record corresponding to the registration instance identifier to the address of record contained in the To header of the SIP Register Request 6210. Upon determining that the address of record corresponding to the registration instance identifier and the address of record contained in the To header of the SIP Register Request 6210 are the same, SBC 106 determines that it can now correlate incoming requests associated with the registration instance based on the registration instance identifier. Operation proceeds from step 6228 to step 6230. In step 6230, SBC 106 generates SIP 200 response 6250 in response to the Register Request 6210. Operation proceeds from step 6230 to step 6240. In step 6240, SBC 106 sends the SIP 200 response message 6250 to UE 1 102. Operation proceeds from step 6240 to step 6260.

In step 6260, UE 1 102 receives the SIP 200 response. Operation proceeds from step 6260 to step 6262. In step 6262, UE 1 102 processes the SIP 200 response message 6250 and determines that UE 1 102 with AOR1 has been successfully registered with SIP Registrar 108. Operation proceeds from step 6262 to step 6264. In step 6264, UE 1 102 detects an user input indicating that the user wants to establish a call. Operation proceeds from step 6264 to step 6270. In step 6270, UE 1 102 generates SIP Invite request message 6290 with credentials in response to the detection of the user input indicating the user wants to establish a call. SIP Invite request message 6290 includes a From header specifying the address of record as AOR1 and an Authentication header with the opaque parameter including the registration instance identifier received in the SIP 401 response message 6170, REG-INS ID=1. Operation proceeds from step 6270 to step 6280. In step 6280, UE 1 102 sends the SIP Invite request message 6290 to SBC 106. Operation proceeds from step 6280 to step 6300.

In step 6300, SBC 106 receives SIP Invite request message 6290 from UE 1 102. Operation proceeds from step 6300 to step 6302. In step 6302, SBC 106 processes the received SIP Invite request 6290. Operation proceeds from step 6302 to step 6304. In step 6304, SBC 106 extracts the registration instance identifier, REG-INS ID=1, from the opaque parameter of the Authentication header of the SIP Invite message 6290. Operation proceeds from step 6304 to step 6306. In step 6306, SBC 106 uses the extracted registration instance identifier REG-INS ID=1 to correlate the SIP Invite 6290 with the registration request instance to which REG-INS ID=1 corresponds. In some embodiments, step 6306 includes sub-steps 6308, 6310 and 6312. In step 6308, SBC 106 uses the extracted registration instance identifier from SIP Invite message 6290 to locate in memory a stored record corresponding to the registration instance identifier. Operation then proceeds from sub-step 6308 to sub-step 6310. In sub-step 6310, SBC 106 retrieves from memory, e.g. from the identified record, the address of record, AOR1, corresponding to the registration instance identifier. Operation then proceeds to sub-step 6312. In sub-step 6312, SBC 106 compares the address of record, AOR1, corresponding to the registration instance identifier with the address of record in the FROM header of SIP Invite message 6290. In this case the comparison shows that the address of record is the same and that the SIP Invite message has been correctly correlated to the SIP registration instance corresponding to SIP registration request message 6030. Upon successfully determining the registration request to which the SIP Invite message 6290 corresponds, SBC 106 generates in step 6314 SIP Invite Request message 6330 based on the SIP Invite message 6290. The SIP Invite Request message 6330 does not include the Authentication header from the SIP Invite Request 6290. In some embodiments, the SIP Invite Request message 6330 is the SIP Invite message 6290 with the Authentication header removed before it is forwarded to the SIP Registrar 108. Operation proceeds from step 6314 to step 6320. In step 6320, SBC 106 sends the SIP Invite Request message 6330 to SIP Registrar 108. Operation proceeds from step 6320 to step 6340.

In step 6340, SIP Registrar 108 receives the SIP Invite message 6330. Operation proceeds from step 6340 to step 6342. In step 6342, SIP Registrar 108 processes the SIP Invite Request message 6330. SIP Registrar 108 does not encounter problems relating to the Authentication header because the Authentication header has been removed by the SBC. The SIP Registrar 108 then proceeds with providing the requested service.

In this way, the SBC is able to correlate which SIP requests and/or calls correspond to which SIP registration instances from the same address of record by using the SIP authentication procedures for non-authentication purposes.

Figure 7A:
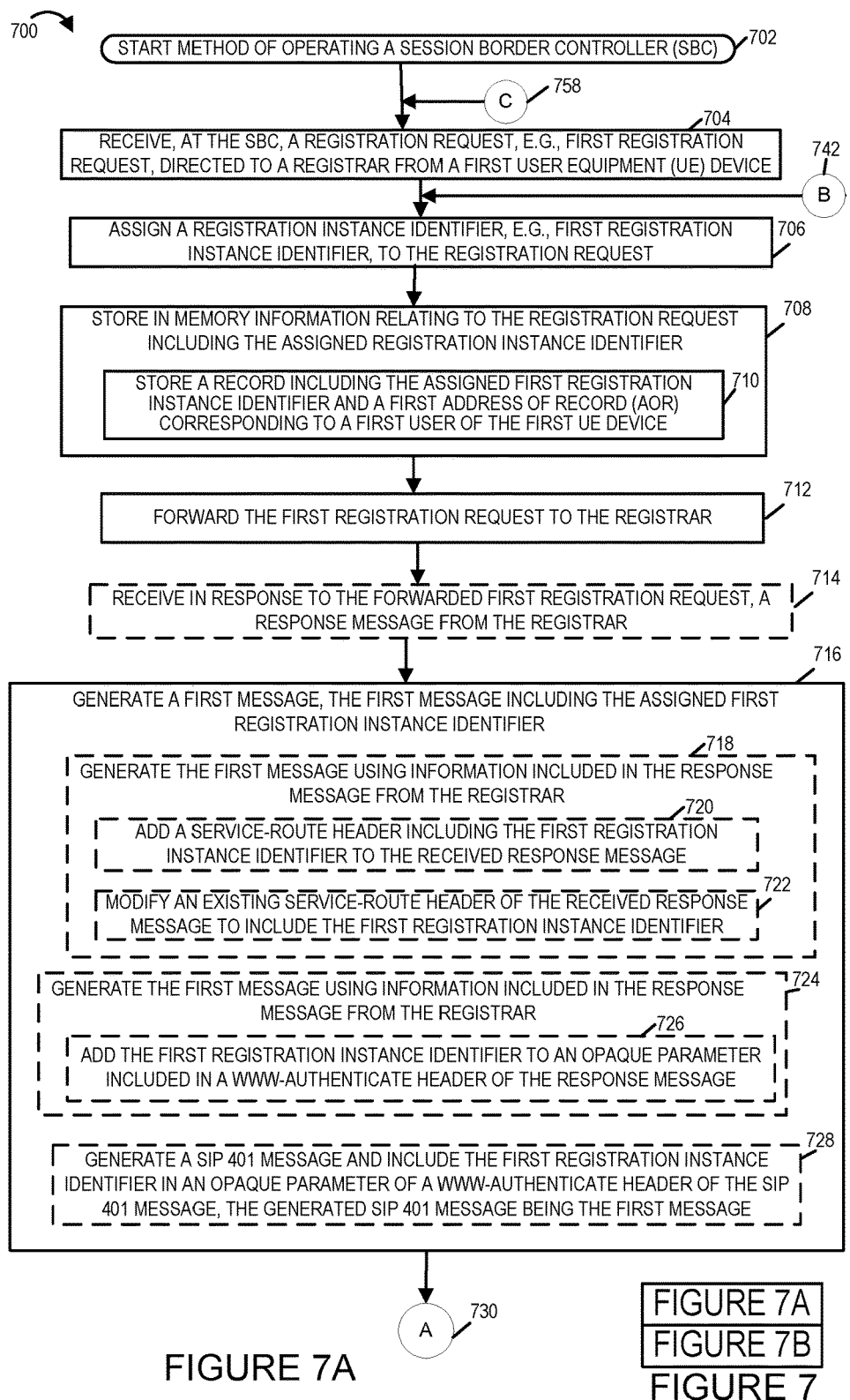
FIG. 7A illustrates a first part of a flowchart showing the steps of an exemplary method of operating a Session Border Controller (SBC) in accordance with one embodiment of the present invention.
Figure 7B:
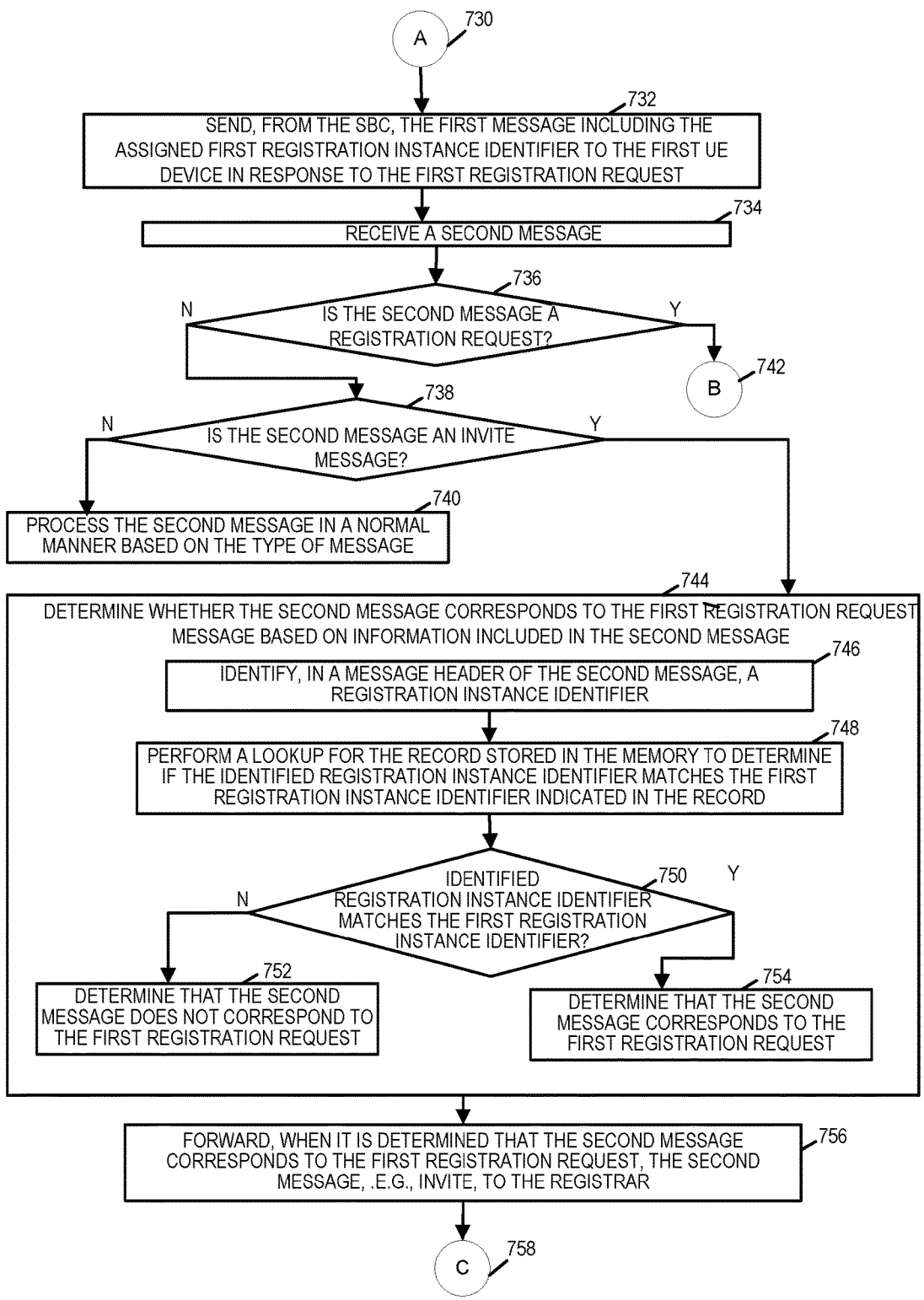
FIG. 7B illustrates a second part of a flowchart showing the steps of the exemplary method of operating a Session Border Controller (SBC) in accordance with one embodiment of the present invention.

FIG. 7 illustrates the combination of FIGS. 7A and 7B. FIG. 7A illustrates a first part of a flowchart showing the steps of an exemplary method of operating a Session Border Controller (SBC) in accordance with one embodiment of the present invention. FIG. 7B illustrates a second part of the flowchart showing the steps of the exemplary method of operating a Session Border Controller (SBC) in accordance with one embodiment of the present invention.

The method 700 commences in start step 702. Operation proceeds from start step 702 to step 704. In step 704, a registration request, e.g., a first registration request, directed to a registrar is received at the SBC from a first user equipment device. Operation proceeds from step 704 to step 706. In step 706, a registration instance identifier, e.g., a first registration instance identifier, is assigned to the registration request. Operation proceeds from step 706 to step 708.

In step 708, the SBC stores in memory information relating to the registration request including the assigned registration instance identifier. In some embodiments, step 708 includes sub-step 710. In sub-step 710 the SBC stores a record including the assigned first registration instance identifier and a first address of record (AOR) corresponding to a first user of the first user equipment device in memory. Operation proceeds from step 708 to step 712.

In step 712, the SBC forwards or sends the first registration request to the registrar. Operation proceeds from step 712 to step 714 which is optional otherwise operation proceeds to step 716.

In optional step 714, the SBC receives in response to the forwarded first registration request a response message from the registrar. Operation proceeds from step 714 to step 716.

In step 716, the SBC generates a first message, the first message including the assigned first registration instance identifier. In some embodiments the method 700 includes one or more optional sub-steps 718, 724, and 728.

In optional sub-step 718, the first message is generated using information included in the response message from the registrar. In some embodiments, sub-step 718 includes sub-step 720 and/or sub-step 722. In sub-step 720, the SBC adds a service-route header including the first registration instance identifier to the received response message. In the sub-step 722, the SBC modifies an existing service-route header of the received response message to include the first registration instance identifier.

In optional sub-step 724, the SBC generates the first message using information included in the response message from the registrar. In some embodiments, sub-step 724 includes sub-step 726. In sub-step 726, the SBC adds the first registration instance identifier to an opaque parameter included in a WWW-Authenticate header of the response message.

In optional sub-step 728, the SBC generates a SIP 401 unauthorized message as the first message and includes the first registration instance identifier in an opaque parameter of a WWW-Authenticate header of the SIP 401 message.

Operation proceeds from step 716 via connection node A 730 to step 732 shown on FIG. 7B. In step 732, the SBC sends from the SBC the first message including the assigned first registration instance identifier to the first user equipment device in response to the first registration request. Operation proceeds from step 732 to step 734.

In step 734, the SBC receives a second message. Operation proceeds from step 734 to decision step 736. In step 736, the SBC determines if the second message is a registration request. If the second message is determined to be a registration request operation proceeds from step 736 via connection node B 742 to step 706 shown on FIG. 7A wherein the SBC processes this new registration request. If the SBC determines in step 736 that the second message is not a registration request then processing proceeds from step 736 to decision step 738.

In decision step 738, the SBC determines if the second message is an Invite request message, e.g., a SIP Invite Request message. If the SBC determines that the second message is an Invite message operation proceeds to step determination 744 otherwise operation proceeds to step 740. In step 740, the SBC processes the second message in a normal manner based on the type of message it is. Returning to determination step 744, in step 744, the SBC determines whether the second message corresponds to the first registration request message based on information included in the second message. In some embodiments, step 744 includes one or more sub-steps 746, 748, 750, 752 and 754. In sub-step 746, the SBC identifies in a message header of the second message a registration instance identifier. Operation proceeds from sub-step 746 to sub-step 748. In sub-step 748, the SBC performs a lookup or search for the record stored in the memory to determine if the identified registration instance identifier matches the first registration instance identifier indicated in the record. Operation proceeds from sub-step 748 to decision sub-step 750. In decision sub-step 750, the SBC determines if the identified registration instance identifier matches the first registration instance identifier. If the SBC determines that the identified registration instance identifier matches the first registration instance identifier then operation proceeds from sub-step 750 to sub-step 754. If the SBC determines that the identified registration instance identifier does not match the first registration instance identifier then operation proceeds to sub-step 752.

In sub-step 752 the SBC determines that the second message does not correspond to the first registration request. The SBC may then search memory to determine if it matches any other stored registration instance identifiers. If it does not in some embodiments, the SBC may then challenge the second message if the second message is a request. In some other embodiments, the SBC rejects the second message.

Returning to sub-step 754, in sub-step 754 the SBC determines that the second message corresponds to first registration request. Operation proceeds from step 744 to step 756. In step 756, the SBC forwards or sends, when it is determined that the second message corresponds to the first registration request, the second message, e.g., SIP Invite request, to the registrar. Operation proceeds from step 756 via connection node C 758 to receiving step 704 shown on FIG. 7A and the processes repeated for the next received registration request.

In some embodiments of method 700, when the identified registration instance identifier matches said first registration instance identifier, the SBC performs the step of verifying whether an address of record included in a FROM header of the second message matches the first address of record indicated in the record.

In some embodiments of the method 700, the first user equipment device, the SBC and the registrar communicate using session initiation protocol (SIP). In some embodiments of method 700, the first registration request is a SIP Register request. In some embodiments of the method 700, the first message is a SIP 200 response. In some embodiments of the method 700, the second message is a SIP Invite message. In some embodiments, the response message from the registrar is a SIP 200 response message received by the SBC in response to a successful registration/authentication of the first user equipment device. In some embodiments of the method 700, generation of the first message by the SBC using information included in the SIP 200 response message received from the registrar includes performing one of (i) adding a Service-Route header including said first registration instance identifier to the 200 response message to generate the first message, or (ii) modifying an existing Service-Route header of the received 200 response message to include the first registration instance identifier.

In some embodiments of the method 700 wherein the second message includes a route header including the first registration instance identifier, the method includes the further step of removing the route header including the first registration instance identifier from the second message, e.g., a SIP Invite message, prior to forwarding the second message to the registrar.

In some embodiments of the method 700, the SBC communicates using SIP and the method further includes the SBC prior to sending the first message to the first user equipment device generating the first message using information included in a SIP 401 message received from the registrar by the SBC. In some of such embodiments, the SIP 401 message from the registrar is received by the SBC in response to the first registration request sent to the registrar. In some of such embodiments, the generation of the first message by the SBC includes adding the first registration instance identifier to an opaque parameter included in a WWW-Authenticate header of the SIP 401 message received from the registrar.

In some embodiments of the method 700, the SBC communicates using SIP and the first message is a SIP 401 message, generated at the SBC, by including the first registration instance identifier in an opaque parameter of a WWW-Authenticate header of the SIP 401 message.

In some embodiments of the method 700, the first registration request from the first user equipment device is received by the SBC via a Network Address Translation device.

In some embodiments of the method 700, the method further includes generating, by the SBC, the first message to include the first registration instance identifier in a message header parameter that will need to be included in at least two subsequent messages from the first user equipment device to the SBC. In some of such embodiments, the message header in which said first registration instance identifier is included remains unaltered when it traverses a Network Address Translation device. In some of the embodiments of the method 700, the message header in which the first registration instance identifier is included is a Service-Route header or a SIP authentication header. In some embodiments of the method 700, the message header parameter in which said first registration instance identifier is included is an opaque parameter of SIP authentication header.

In some embodiments the method 700 further includes receiving, at the SBC, a SIP 200 response message from the registrar in response to said first registration request. In some embodiments, the registrar is a SIP registrar that is also an application server. In some of such embodiments the method 700 further includes the step of generating, at the SBC, the first message wherein the first message is a SIP 401 message including an authentication header with an opaque parameter including the first registration instance identifier. In some of such embodiments, the method 700 also includes the steps of (i) receiving, in response to the SIP 401 message, a response message including the opaque parameter including the first registration instance identifier from the first user equipment device and (ii) terminating at the SBC the response message including the opaque parameter including the first registration instance identifier from the first user equipment device received wherein terminating includes refraining from forwarding the response message to the registrar.

In some embodiments of the method 700 wherein the second message includes an authorization header including the first registration instance identifier, the method further includes removing the authorization header including the first registration instance identifier from the second message, e.g., SIP Invite message, prior to forwarding or sending the second message to the registrar.

In some embodiments of the method 700 wherein the second message includes an authorization header with an opaque parameter including the first registration instance identifier, the method further includes removing the first registration instance identifier from the opaque parameter included in the authorization header of the second message prior to forwarding the second message to the registrar.

In some embodiments of the method 700 wherein the second message includes a route header including the first registration instance identifier, the method further includes removing the route header including the first registration instance identifier from the second message, e.g., SIP Invite request, prior to forwarding or sending the second message to the registrar.

Method 800 of FIG. 8 illustrates the steps and associated signaling exchange between various devices/servers performed in an exemplary method used for correlating a registration instance with a corresponding active call after a switchover event in accordance with one exemplary embodiment of the present invention. The exemplary system upon which the method 800 has been employed includes user equipment device 1 (UE 1) 801, user equipment device 2 (UE 2) 802, Session Border Controller 1 (SBC-1) 804, Session Border Controller 2 (SBC-2) 806, and SIP Registrar/Application Server (AS) 808. The method 800 addresses a scenario where there are multiple instances registered with the same address of record and an active call is established by one of the registered instances before a switchover of the SBC for example due to a failure. At the time of the switchover, new TCP connections need to be established and the particular registration instance which correlates to the active call is not know by the new SBC to which the service was switched. When a mid-dialog request for the active call is received by the new SBC from the application server, the new SBC forks the mid-dialog request to all user equipment devices registered with an address of record which matches the user equipment address of record for the call. The registration instance which actually has the active call matches the mid-dialog request to a call it has and replies accordingly. Other instances fail to match the call to an active call they currently have and reply with a SIP 481 ("Call Transaction Does Not Exist") response message. The connection from the new SBC toward the user equipment device which did not reply with a SIP 481 response is then determined to be the correct registration instance for the call and is used for further signaling for the call. In this way, a SBC which has been inserted into an active call flow after a switchover can identify and correlate which particular registration instance from a multitude of registration instances having the same address of record corresponds to the active call.

The details of the exemplary method are now described. Operation starts in step 810 and proceeds to step 811. In step 811, UE 1 801 establishes a signaling communication path 812 with SBC 1 804. Operation proceeds from step 811 to step 816. In step 816, SBC-1 804 establishes a signaling communication path 818 with SIP Registrar/Application Server 808. In some embodiments of the present invention, SIP Registrar/Application Server 808 is just an Application Server. Operation proceeds from step 816 to step 822. In step 822, the SIP Registrar/Application Server registers UE 1 801 with an address of record 1 (AOR-1). As noted in boxes 814 and 820, the signaling communication paths 812 and 818 are for the active registration of AOR-1 from UE 1 801.

In step 824, UE 2 802 establishes a signaling communication path 826 with SBC 1 804. Operation proceeds from step 824 to step 828. In step 828, SBC-1 804 establishes a signaling communication path 832 with SIP Registrar/Application Server 808. Operation proceeds from step 828 to step 836. In step 836, the SIP Registrar/Application Server registers UE 2 802 with an address of record 1 (AOR-1). As noted in boxes 830 and 834, the signaling communication paths 826 and 832 are for the active registration of AOR-1 from UE 2 802. There are now two active registrations with the same address of record AOR-1. Operation proceeds from step 836 to step 838.

In step 838, UE 1 801 establishes active call leg 1 840, call-1 as described in box 842, between UE 1 801 and SBC-1 804. Operation proceeds to step 846. In step 846, SBC-1 804 establishes active call leg 1' 850, call-1' as described in box 852, between SBC-1 804 and the Application Server 808. Call-1 840 and Call-1' are call legs of the same call corresponding to the active registration instance AOR-1 for UE 1 801. The call may be, and in some embodiments is, a Voice Over Internet Protocol call. Operation proceeds from step 846 to step 854 wherein the Application Server performs call processing activities for the active call. Operation proceeds from step 854 to step 856.

In step 856, a switchover from —SBC-1 804 to SBC-2 806 is performed for example in response to a failure of the SBC-1 804 as described in box 857. With the switchover, SBC-2 808 begins servicing UE 1 801 and UE 2 802 registrations and the active call with call-1 and call-1' legs.

After the switchover, in step 858 UE 1 801 establishes between UE 1 801 and SBC-2 806 a new TCP connection and communications path 860, as described in box 861, for the AOR-1 registration. In step 862, SBC-2 performs TCP connection establishment functions.

Also, after the switchover, in step 864 UE 2 802 establishes between UE 2 802 and SBC-2 806 a new TCP connection and communications path 866, as described in box 867, for its AOR-1 registration. In step 868, SBC-2 performs TCP connection establishment functions.

At this time, SBC-2 808 is supporting two registration instances for AOR-1 one from UE 1 801 and one from UE 2 802 but does not know to which AOR-1 registration the active call, call-1, corresponds. Operation proceeds to step 869. In step 869, the SIP Registrar/Application Server 808 generates a SIP mid-dialog request message 872 for call-1 as described in box 876. Operation proceeds from step 869 to step 870. In step 870, SIP Registrar/Application Server 808 sends the SIP mid-dialog request 872 for call-1 to SBC-2 806. Operation proceeds from step 870 to step 874.

In step 874, SBC-2 806 receives the SIP mid-dialog request 872 for call-1 from Registrar/Application Server 808. Operation proceeds from step 874 to step 875. In step 875, SBC-2 determines that the address of record for the mid-dialog request 872 is for address of record AOR-1. Operation proceeds from step 875 to step 878. In step 878, SBC-2 808 determines that it cannot identify the particular AOR-1 registration instance for which the mid-dialog request 872 is the intended recipient and that the mid-dialog request 872 for call-1 is to be forked. Operation proceeds from step 878 to step 879. In step 879, SBC-2 determines each of currently active registration instances having an address of record AOR-1. Operation proceeds from step 879 to steps 880 and 884.

In step 880, SBC-2 806 sends the mid-dialog request for call-1 881 to UE 1 801. In some embodiments of the method 800, the mid-dialog request 881 is merely a reformatted version of mid-dialog request 872. In some embodiments, SBC-2 806 generates the mid-dialog request 881 based on the mid-dialog request 872. Operation proceeds from step 880 to step 882. In step 882, UE-1 receives SIP mid-dialog request 881. Operation proceeds from step 881 to step 891.

In step 884, SBC-2 806 sends the mid-dialog request for call-1 885 to UE 2 802. In some embodiments of the method 800, the mid-dialog request 885 is merely a reformatted version of mid-dialog request 872. In some embodiments, SBC-2 806 generates the mid-dialog request 885 based on the mid-dialog request 872. Operation proceeds from step 884 to step 886. In step 886, UE 2 802 receives the mid-dialog request 885. Operation proceeds from step 886 to step 887. In step 887, UE 2 802 determines that mid-dialog request 885 does not match to a call and generates SIP 481 response message 889 which indicates that the call/transaction does not exist at UE 2 802. Operation proceeds from step 887 to step 888. In step 888, UE 2 802 sends the SIP 481 response message 889 to SBC-2 806. Operation proceeds from step 888 to step 890. In step 890, SBC-2 receives the SIP 481 response message.

In step 891, UE 1 801 determines that the mid-dialog request matches to call-1. Operation proceeds from step 891 to step 892. In step 892, UE 1 801 generates a SIP 200 response message 893 to the mid-dialog request message 881. Operation proceeds from step 892 to step 894. In step 894, UE 1 801 sends the SIP 200 response message 893 to SBC-2 806. Operation proceeds from step 894 to step 895. In step 895, SBC-2 806 receives the SIP 200 response message 893. Operation proceeds from step 895 to step 896.

In step 896, SBC-2 806 determines which user equipment device and in particular which active AOR-1 registration instance corresponds to the active call-1 based on the responses to the forked mid-dialog request. In some embodiments, SBC-2 806 determines which user equipment device AOR-1 registration instance did not respond with a SIP 481 response message to the mid-dialog request which had been forked to each of the active AOR-1 registration instances. In this example, UE-1 801 did not respond with a SIP 481 message. SBC-2 806 then determines that the UE-1 801 AOR-1 registration instance corresponds to call-1 and correlates call-1 with UE-1's AOR-1 registration instance as described in box 897. In some embodiments, SBC-2 806 determines which user equipment device AOR-1 registration instance responded with a SIP 200 message to the mid-dialog request which had been forked to each of the active AOR-1 registration instances. In this example, UE-1 801 responded with a SIP 200 message. SBC-2 806 then determines that the UE-1 801 AOR-1 registration instance corresponds to call-1 and correlates call-1 with UE-1's AOR-1 registration instance. SBC-2 806 then uses the TCP connection and communication path 860 for future signaling for call-1.

SBC-2 806 stores in memory information identifying the UE-1 801 AOR-1 registration instance as corresponding to call-1 for future use. When additional signaling pertaining to call-1 is received, SBC-2 801 uses the stored information to determine the correct UE 1 AOR-1 registration instance for call-1 and the corresponding TCP connection and communication path.

Using exemplary method 800, a SBC is able to correlate which registration instance address of record corresponds to an active call after a switchover event when there are multiple active instances for the same address of record.

In some embodiments of the method 800, exemplary SBC-1 804 and SBC-2 806 are implemented in accordance with the exemplary Session Border Controller 900 shown in FIG. 9; UE 1 801 and UE 2 802 are implemented in accordance with the user equipment device 1000 shown in FIG. 10; and SIP Registrar/Application Server 808 is implemented in accordance with the exemplary Registration Server/Application Server 1100 shown in FIG. 11.

Figure 13A:
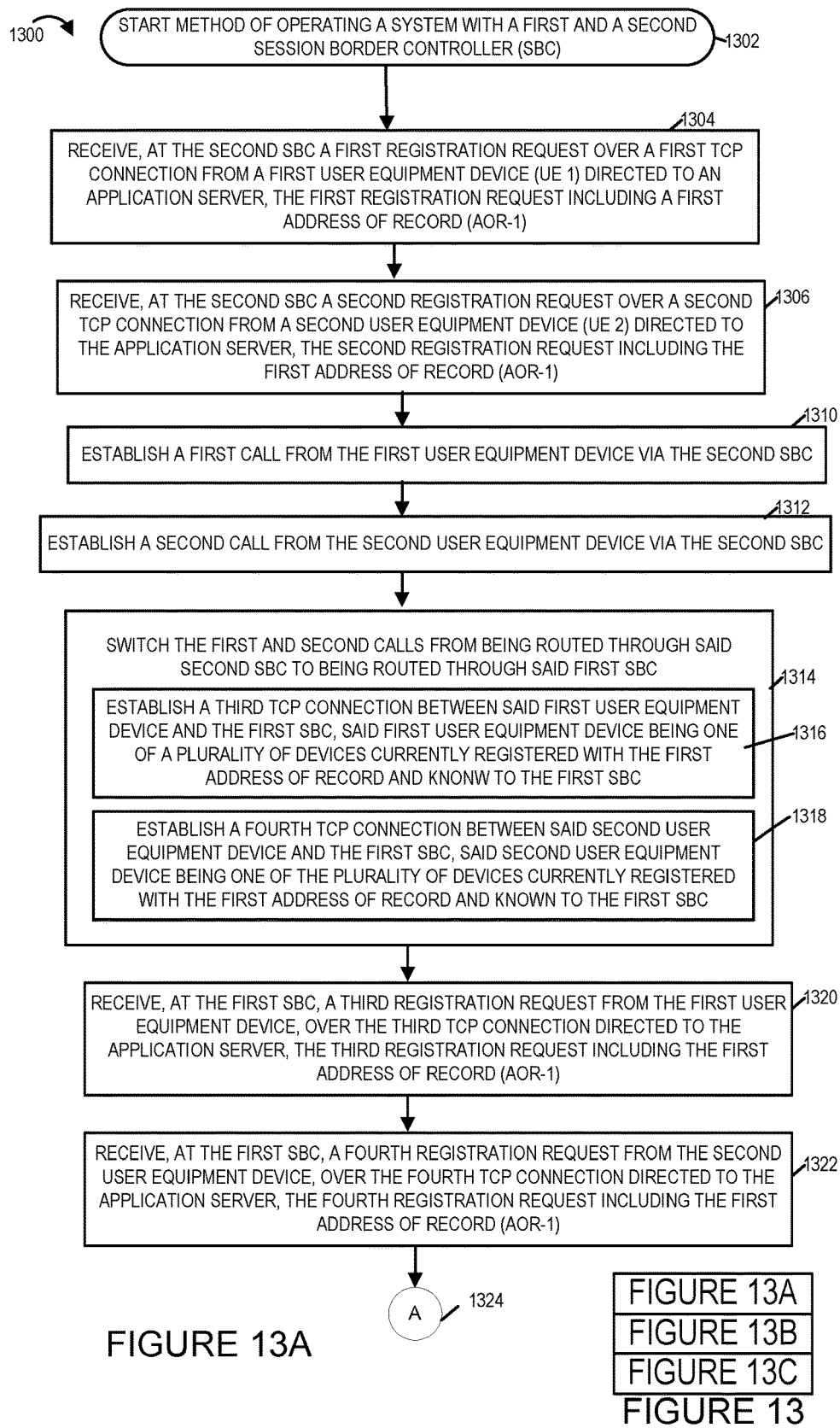
FIG. 13A illustrates a first part of a flowchart showing the steps of an exemplary method of operating a communications system in accordance with one embodiment of the present invention.
Figure 13B:
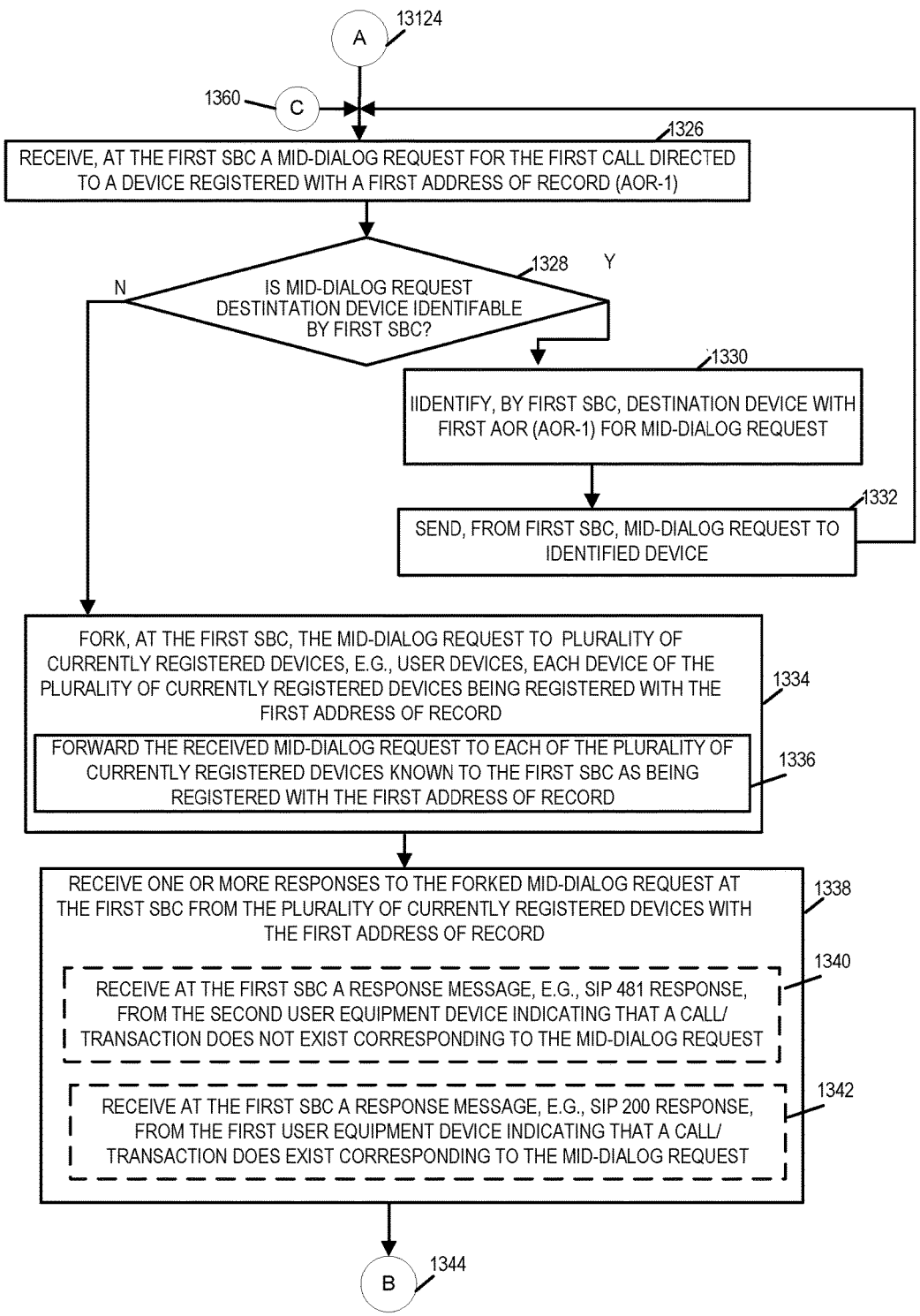
FIG. 13B illustrates a second part of a flowchart showing the steps of the exemplary method of operating a the steps of an exemplary method of operating a communications system in accordance with one embodiment of the present invention.
Figure 13C:
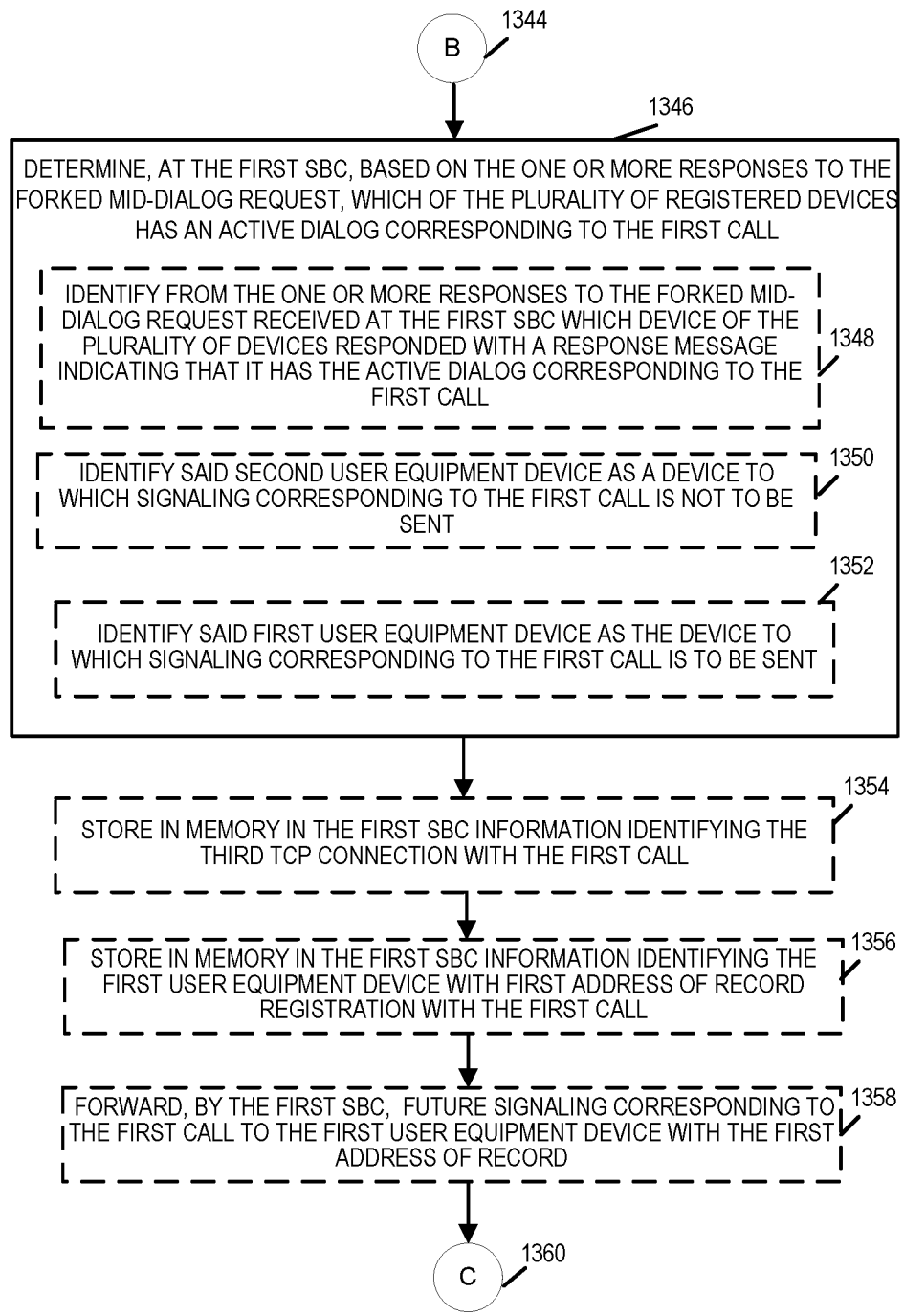
FIG. 13C illustrates a third part of a flowchart showing the steps of the exemplary method of operating a the steps of an exemplary method of operating a communications system in accordance with one embodiment of the present invention.

FIG. 13 comprises FIGS. 13A, 13B, and 13C. The flowchart of the method 1300 of FIG. 13 illustrates another exemplary method of identifying which registration instance address of record corresponds to an active call after a SBC switchover event when there are multiple active registered instances with the same address of record.

The method 1300 of operating a system with a first and a second Session Border Controller (SBC) starts in step 1302 shown on FIG. 13A. Operation proceeds from step 1302 to step 1304. In step 1304, a first registration request is received at the second SBC over a first Transmission Control Protocol (TCP) connection from a first user equipment device directed to an application server. The first registration request includes a first address of record (AOR1). Operation proceeds from step 1304 to step 1306. In step 1306, a second registration request over a second TCP connection from a second user equipment device is received at the second SBC. The second registration request includes the first address of record (AOR1). Operation proceeds from step 1306 to step 1310.

In step 1310, a first call, e.g., first VOIP call, is established from the first user equipment device via the second SBC. Operation proceeds from step 1310 to step 1312. In step 1312, a second call, e.g., second VOIP call, is established from the second user equipment device via the second SBC. Operation proceeds from step 1312 to step 1314.

In step 1314, the first and second calls are switched from being routed through the second SBC to be routed via the first SBC. In some embodiments, step 1314 includes substeps 1316 and 1318. In sub-step 1316, a third TCP connection between the first user equipment device and the first SBC is established. In sub-step 1318, a fourth TCP connection between the second user equipment device and the first SBC is established. The first and second user equipment devices each being one of a plurality of user equipment devices currently registered with the first address of record and known to the first SBC. Operation proceeds from step 1314 to step 1320.

In step 1320, a third registration request is received at the first SBC from the first user equipment device over the third TCP connection. The third registration request being directed to the application server and including the first address of record (AOR1). Operation proceeds from step 1320 to step 1322. In step 1322, a fourth registration request is received at the first SBC from the second user equipment device over the fourth TCP connection. The fourth registration request being directed to the application server and including the first address of record. Operation proceeds from step 1322 via connection node A 1324 to step 1326 shown on FIG. 13B.

In step 1326, a mid-dialog request, e.g., a SIP mid-dialog request, for the first call is received at the first SBC. The mid-dialog request being directed to a device registered with a first address of record (AOR-1). In some instances, the mid-dialog request is received from a network device such as for example an application server. Operation proceeds from step 1326 to decision step 1328. In decision step 1328, a decision is made as to whether the first mid-dialog request destination device is identifiable by the first SBC. If it is determined that the mid-dialog request destination is identifiable by the first SBC then operation proceeds to step 1330. If it is determined that the mid-dialog request destination is not identifiable by the first SBC then operation proceeds to step 1334.

In step 1330, the first SBC identifies the destination device with the first AOR-1 for the mid-dialog request. Operation proceeds from step 1330 to step 1332. In step 1332, the mid-dialog request is forwarded or sent to the identified device. Operation proceeds from step 1332 to step 1326 wherein the next mid-dialog request is received at the first SBC and the process continues.

When it is determined that the first SBC cannot identify the destination for the mid-dialog request in step 1328, operation proceeds to step 1334. In step 1334, the mid-dialog request is forked at the first SBC to a plurality of currently registered devices, e.g. user devices, wherein each device of the plurality of currently registered devices is registered with the first address of record (AOR-1). In some embodiments, step 1334 includes sub-step 1336. In sub-step 1336, the received mid-dialog request is forwarded by the first SBC to each of the plurality of currently registered devices known to the first SBC as being registered with the first address of record (AOR-1). Operation proceeds from step 1334 to step 1338.

In step 1338, one or more responses are received at the first SBC in response to the forked mid-dialog request from the plurality of currently registered devices with the first address of record. In some embodiments, step 1338 includes one or both of sub-steps 1340 and 1342. In sub-step 1340, a response message, e.g., a SIP 481 response message, is received at the first SBC from the second user equipment device indicating that a call/transaction does not exist corresponding to the mid-dialog request. In sub-step 1342, a response message, e.g., a SIP 200 response, is received at the first SBC from the first user equipment device indicating that a call/transaction does exist corresponding to the mid-dialog request. Operation proceeds from step 1338 via connection node B 1344 to step 1346 shown on FIG. 13C.

In step 1346, it is determined, at the first SBC, which of the plurality of registered devices has an active dialog corresponding to the first call based on the one or more responses to the forked mid-dialog request. In some embodiments, step 1346 includes one or more of sub-steps 1348, 1350 and 1352. In sub-step 1348, the first SBC is operated to identify from the one or more responses to the forked mid-dialog request received at the first SBC which device of the plurality of devices responded with a response message indicating that it has the active dialog corresponding to the first call. In step 1350, first SBC identifies the second user equipment device as a device to which signaling corresponding to the first call is not to be sent. In step 1352, the first SBC identifies the first user equipment device as the device to which signaling corresponding to the first call is to be sent. Operation proceeds from step 1346 to optional step 1354. In step 1354, the first SBC stores in memory in the first SBC information identifying the third TCP connection with the first call. Operation proceeds from step 1354 to optional step 1356. In step 1356, the first SBC stores in memory in the first SBC information identifying the first user equipment device with the first address of record (AOR-1) with the first call. Operation proceeds from step 1356 to optional step 1358. In step 1358 the first SBC forwards future signaling corresponding to the first call to the first user equipment device registered with the first address of record (AOR-1). Operation proceeds from step 1346, 1354, 1356, or 1358 depending on which optional steps are performed via connection node C 1360 to step 1326 wherein the next mid-dialog request is received for processing.

In some embodiments, the steps of the method of FIG. 13 proceed or follow the steps of the method of FIG. 7. For example, in a situation in which the SBC implementing the method of FIG. 7 cannot determine which registration instance a mid-dialog request corresponds for example after a switchover event, the SBC may employ the method 1300.

Table 1200 of FIG. 12 is an exemplary information table including information that can be used to map registration instances with subsequent service requests using exemplary registration instance identifiers that are assigned in accordance with some embodiments of the invention. The table 1200 may be, and in some embodiments is, generated by a Session Border Controller such as for example, SBC 900 of FIG. 9 and stored in memory, e.g., data/information section 920 of memory 910. Row 1210 of table 1200 is not part of the information included in the table but is a header which has been included for explanatory purposes. Table 1200 includes registration instance identifier information included in column 1202, registration request information included in column 1204, address of record information included in column 1206 and device identification information included in column 1208. Each row of table 1200 is a record that associates the registration instance identifier assigned by the SBC in column 1202 with the corresponding request in column 1204, address of record in column 1206 and device in column 1208. For example, row 1212 is a record including REG-INS ID=1 (row 1210, column 1202 entry) assigned by the SBC in connection with the registration request R1 (row 1210, column 1204 entry) which included the address of record AOR1 (row 1210, column 1206) and was received from device UE1 (row 1210, column 1208). Rows 1212, 1214, 1216, 1218, 1220, 1222, . . . , 1224 each contain a record with information pertaining to a different registration request received by the SBC. Each record containing the registration instance identifier and corresponding registration request, address of record and device. In some embodiments, the SBC uses the records and information stored in table 1200 to properly correlate requests for service such as for example a SIP Invite request, call service requests, etc., with their corresponding registration instances when there exists multiple registration instances with the same address of record. In some embodiments an additional column is included in the table which includes TCP connection information corresponding to each registration request. In some embodiments, the table includes a column in which the method in which the registration instance identifier is to be received with requests, e.g., in the opaque parameter or service route header, is included in table 1200.

Figure 14:
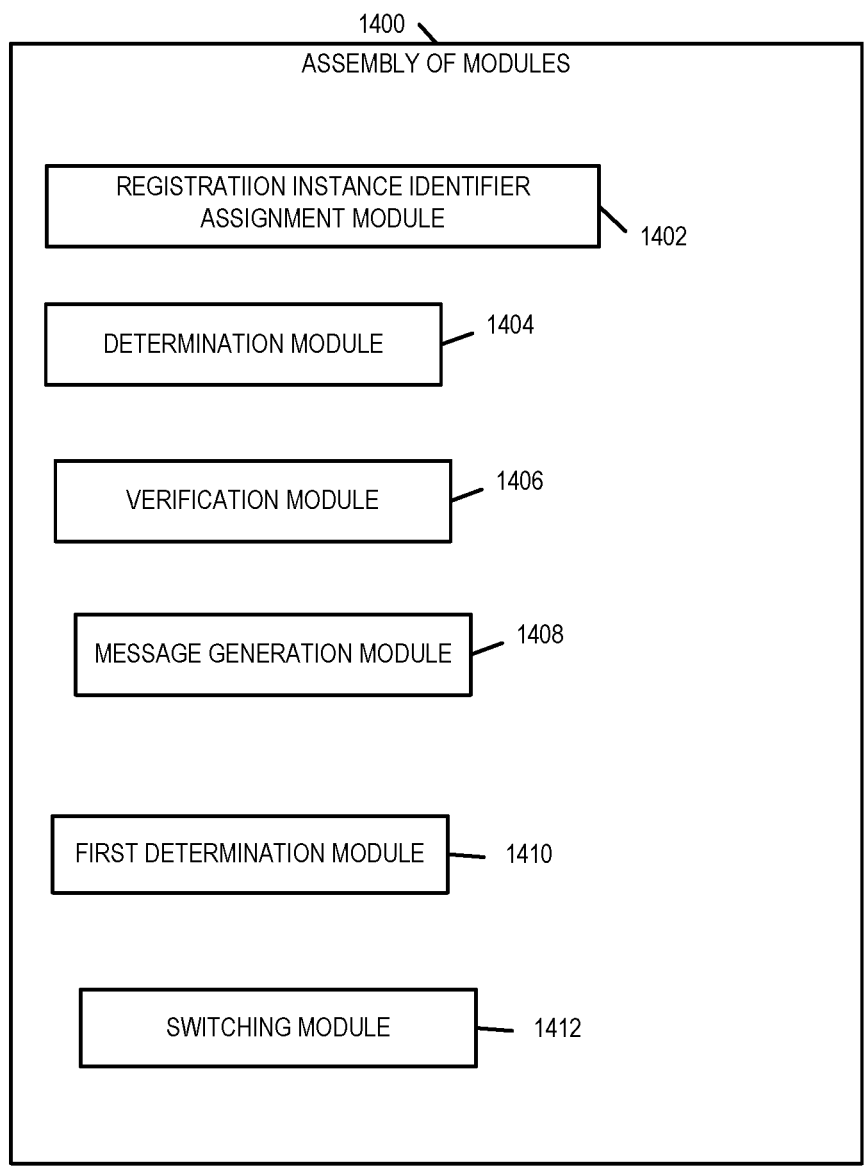
FIG. 14 is an exemplary assembly of modules in accordance with one embodiment of the present invention.

Assembly of modules 1400 illustrated in FIG. 14 is exemplary assembly of modules in one accordance with one embodiment of the present invention which may be, and in some embodiments is, used in the exemplary Session Border Controller 900 as either the assembly of modules 919 and/or the assembly of module 918. In some embodiments one or more modules of the assembly of modules 1400 is included in the assembly of modules 919 and/or the assembly of modules 918. The assembly of modules includes a registration instance assignment module 1402, a determination module 1404, verification module 1406, a message generation module 1408, a first determination module 1410, a and a switching module 1412.

As previously explained, various features of the invention allow for effectively correlating registrations to subsequent service requests even where multiple devices are registered with the same address of record.

The techniques of various embodiments may be implemented using software, hardware and/or a combination of software and hardware. Various embodiments are directed to apparatus, e.g., border controllers, telecommunications systems, network nodes and/or network equipment devices. Various embodiments are also directed to methods, e.g., method of controlling and/or operating border controllers, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments nodes and/or elements described herein are implemented using one or more modules to perform the steps corresponding to one or more methods, for example, message reception, signal processing, authenticating, sending, comparing, determining and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first communications device comprising:
   receiving, at the first communications device from a second communications device performing a SIP registration service, a first Session Initiation Protocol (SIP) message destined for a first user equipment device;
   generating, at the first communications device, a second SIP message based on the first SIP message, said generating comprising including first registration instance identification information in the second SIP message, said first registration instance identification information for inclusion in one or more subsequent SIP messages sent from said first user equipment device to said first communications device; and
   transmitting, from the first communications device, said second SIP message to said first user equipment device.

2. The method of claim 1 wherein said first SIP message is a SIP response message generated by the second communications device in response to a first registration request from the first user equipment device.

3. The method of claim 2 wherein said first registration request is a first SIP registration request message including a first Address Of Record (AOR).

4. The method of claim 3 wherein said first SIP message is a SIP 200 message and said second SIP message is a SIP 200 message.

5. The method of claim 3 further comprising:
   storing said first registration instance identification information in memory,
   receiving a third SIP message subsequent to said first communications device transmitting said second SIP message to said first user equipment device, said third SIP message including registration instance identification information;
   determining, at the first communications device, whether the third SIP message correlates to the registration request based on the registration instance identification information included in the third SIP message.

6. The method of claim 5 wherein said determining, at the first communications device, whether the third SIP message correlates to the first registration request based on the registration instance identification information included in the third SIP message includes comparing the registration instance identification information included in the third SIP message to the first registration instance identification information stored in memory.

7. The method of claim 6 further comprising:
   wherein determining, at the first communications device, whether the third SIP message correlates to the first SIP registration request message includes determining that the third SIP message correlates to the first SIP registration request message when said registration instance identification information included in said third SIP message matches said first registration instance identification information stored in memory.

8. The method of claim 5 wherein determining, at the first communications device, whether the third SIP message correlates to the first SIP registration request message includes determining that the third SIP message correlates to the first SIP registration request message when said third SIP message is a SIP INVITE request message with the FROM header including the first Address Of Record and the registration instance identification information included in the third SIP message being the first registration instance identification information, said method further comprising:
    generating a fourth SIP message based on said third SIP message, said fourth SIP message being a SIP INVITE request message including registration identification information identifying said fourth SIP message as corresponding to the first registration request,
    transmitting said forth SIP message to said second communications device.

9. The method of claim 1 further including:
    assigning by the first communications device different registration instance identification information to different registration instances existing at the same time and having the same address of record;
    receiving a third SIP message including a first Address of Record and the first registration instance identification information during a time when multiple registration instances exist for the first address of record; and
    determining based on the first Address Of Record and the first registration instance identification information that the third SIP message correlates to the registration instance corresponding to the first SIP message received by the first communications device.

10. A communications system comprising:
    a first communications device including:
        one or more processors that operate the first communications device to:
            receive from a second communications device performing a SIP registration service a first Session Initiation Protocol (SIP) message destined for a first user equipment device;
            generate a second SIP message based on the first SIP message, said generate the second SIP message based on the first SIP message comprising including first registration instance identification information in the second SIP message, said first registration instance identification information for inclusion in one or more subsequent SIP messages sent from said first user equipment device to said first communications device; and
            transmit said second SIP message to said first user equipment device.

11. The communications system of claim 10 wherein said first SIP message is a SIP response message generated by the second communications device in response to a first registration request from the first user equipment device.

12. The communications system of claim 11 wherein said first registration request is a first SIP registration request message including a first Address Of Record (AOR).

13. The communications system of claim 12 wherein said first SIP message is a SIP 200 message and said second SIP message is a SIP 200 message.

14. The communications system of claim 12,
    wherein said first communications device further comprises a memory in which the first registration instance identification information is stored; and
    wherein said one or more processors further operate the first communications device to:
        receive a third SIP message subsequent to said first communications device transmitting said second SIP message to said first user equipment device, said third SIP message including registration instance identification information, and
        determine whether the third SIP message correlates to the registration request based on the registration instance identification information included in the third SIP message.

15. The communications system of claim 14 wherein said operating the first communications device to determine whether the third SIP message correlates to the first registration request based on the registration instance identification information included in the third SIP message includes comparing the registration instance identification information included in the third SIP message to the first registration instance identification information stored in said memory.

16. The communications system of claim 15 further comprising:
    wherein said operating the first communications device to determine whether the third SIP message correlates to the first SIP registration request message includes determining that the third SIP message correlates to the first SIP registration request message when said registration instance identification information included in said third SIP message matches said first registration instance identification information stored in the memory.

17. The communications system of claim 14,
    wherein said operating the first communications device to determine whether the third SIP message correlates to the first SIP registration request message includes determining that the third SIP message correlates to the first SIP registration request message when said third SIP message is a SIP INVITE request message with the FROM header including the first Address Of Record and the registration instance identification information included in the third SIP message being the first registration instance identification information; and
    wherein said one or more processors operate the first communications device to:
        generate a fourth SIP message based on said third SIP message, said fourth SIP message being a SIP INVITE request message including registration identification information identifying said fourth SIP message as corresponding to the first registration request, and
        transmit said forth SIP message to said second communications device.

18. The communications system of claim 14,
    wherein said third SIP message is received by the first communications device after said third SIP message has traversed a Network Address Translation (NAT) device; and
    wherein said first registration instance identification information is not modified by the NAT device.

19. The communications system of claim 10 wherein said one or more processors further operate said first communications device to:
    assign different registration instance identification information to different registration instances existing at the same time and having the same address of record, and
    receive a third SIP message including a first Address Of Record and the first registration instance identification information during a time when multiple registration instances exist for the first address of record; and
    determine based on the first Address Of Record and the first registration instance identification information that the third SIP message correlates to the registration instance corresponding to the first SIP message received by the first communications device.

20. A non-transitory computer readable medium including a first set of computer executable instructions which when executed by a processor of a first communications device cause the first communications device to perform the steps of:

receiving, at the first communications device from a second communications device performing a SIP registration service, a first Session Initiation Protocol (SIP) message destined for a first user equipment device;

generating, at the first communications device, a second SIP message based on the first SIP message, said generating comprising including first registration instance identification information in the second SIP message, said first registration instance identification information for inclusion in one or more subsequent SIP messages sent from said first user equipment device to said first communications device; and transmitting, from the first communications device, said second SIP message to said first user equipment device.

\* \* \* \* \*